US012724834B2

(12) United States Patent
Zovic et al.

(10) Patent No.: US 12,724,834 B2
(45) **Date of Patent: *Sep. 1, 2026**

(54) SYSTEM AND METHOD FOR AUTOMATED FILE REPORTING

(71) Applicant: WISEDOCS INC., Toronto (CA)

(72) Inventors: Leo Zovic, North York (CA); Connor Atchison, Elora (CA); Luke Boudreau, Rockville (CA); Wei Sun, Kitchener (CA); Ryan Jugdeo, Toronto (CA); Erik Derohanian, Toronto (CA)

(73) Assignee: WISEDOCS INC., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 19/057,469

(22) Filed: Feb. 19, 2025

(65) Prior Publication Data

US 2025/0190497 A1 Jun. 12, 2025

Related U.S. Application Data

(63) Continuation of application No. 17/616,451, filed as application No. PCT/CA2020/050782 on Jun. 5, 2020, now Pat. No. 12,259,930.

(60) Provisional application No. 62/857,930, filed on Jun. 6, 2019.

(51) Int. Cl.

| | |
|---|---|
| ***G06F 16/906*** | (2019.01) |
| ***G06F 16/901*** | (2019.01) |
| ***G06F 16/93*** | (2019.01) |

(52) U.S. Cl.
CPC .......... *G06F 16/906* (2019.01); *G06F 16/901* (2019.01); *G06F 16/93* (2019.01)

(58) Field of Classification Search
CPC ...... G06F 16/906; G06F 16/901; G06F 16/93; G06F 16/13; G06N 5/022; G06N 3/045; G06N 3/0475; G06N 3/0499; G06N 3/08; G06N 3/09; G06N 20/00
See application file for complete search history.

(56) References Cited

U.S. PATENT DOCUMENTS 11,935,316 B1 3/2024 Rangarajan
2008/0114757 A1* 5/2008 Dejean .................. G06F 16/258 707/E17.084

(Continued)

FOREIGN PATENT DOCUMENTS

WO 2024020701 A1 2/2024

*Primary Examiner* — Charles Rones
*Assistant Examiner* — Xiaoqin Hu
(74) *Attorney, Agent, or Firm* — Bennett Jones LLP; Lorelei G. Graham

(57) ABSTRACT

A document index generating system and method are provided. The system has at least one processor and a memory storing a sequence of instructions which when executed by the at least one processor configures the at least one processor to perform the method. The method preprocesses a plurality of pages into a collection of data structures, classifies each preprocessed page into at least one document type, segments groups of classified pages into documents, and generates a page and document index for the plurality of pages based on the classified pages and documents. Each data structure has a representation of data for a page of the plurality of pages. The representation has at least one region on the page.

19 Claims, 23 Drawing Sheets

(56) References Cited

U.S. PATENT DOCUMENTS

| | | | | |
|---|---|---|---|---|
| 2010/0005060 | A1* | 1/2010 | Shebanow | G06F 16/2228 707/E17.108 |
| 2016/0055375 | A1* | 2/2016 | Neavin | H04N 1/00 382/218 |
| 2018/0067957 | A1* | 3/2018 | Paterson | G06F 40/114 |
| 2021/0019512 | A1 | 1/2021 | Uppal | |

* cited by examiner

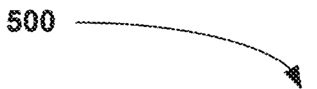

Oso Medical Imaging
100 Imaging Rd.
Toronto, ON, Z0P 0A0 Tel: (416) 555 1000

Referring Doctor: T. Bjorn
Service Date: 11-Feb-2017

Patient Name: Doe, Jane
HC #: 0123401234
DOB: 01-Feb-1999
Phone Number: 647 555-0789

X-RAY CHEST AP AND LATERAL VIEWS

COMPARISON: None

INDICATION: Cough and fever

FINDINGS:
Lungs: The lungs are well inflated and clear. There is no evidence of pneumonia or pulmonary edema.
Pleura: There is no pleural effusion or pneumothorax.
Heart and mediastinum: The cardiomediastinal silhouette is normal.
Bones: The visualized skeleton is normal.

502 IMPRESSION: 504 Clear lungs without evidence of pneumonia.

RECOMMENDATION: None.

D. Quinn M.D.F.R.C.P.(C)
Dictated Date:
Transcribed Date:
(DICTATED BUT NOT READ)

CONFIDENTIALITY: This report is intended only for the use of the individual to whom or the entity to which its addressed and may contain confidential and privileged information. If you are not the intended recipient, please notify us by telephone. Any distribution, reproduction or the use of this information is prohibited.

Page 1 of 2

FIG. 5

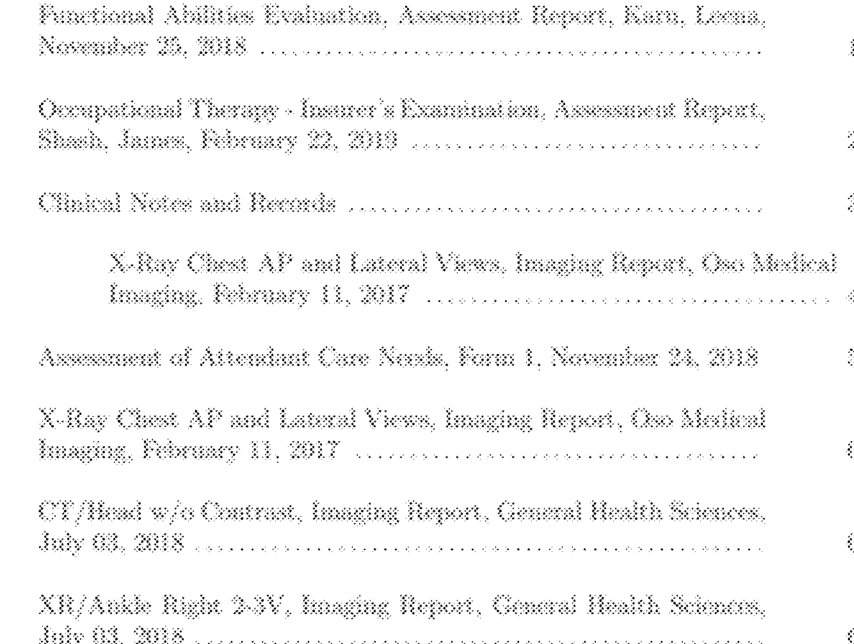

Name: Jane Doe
Claimant Date of Birth: 1999-02-01
Date of Loss: 2018-07-03
Claim #: 1234567

Document List

Functional Abilities Evaluation, Assessment Report, Kara, Leena, November 25, 2018 ........ 1

Occupational Therapy - Insurer's Examination, Assessment Report, Shash, James, February 22, 2019 ........ 22

Clinical Notes and Records ........ 35

X-Ray Chest AP and Lateral Views, Imaging Report, Oso Medical Imaging, February 11, 2017 ........ 43

Assessment of Attendant Care Needs, Form 1, November 24, 2018 ........ 57

X-Ray Chest AP and Lateral Views, Imaging Report, Oso Medical Imaging, February 11, 2017 ........ 64

CT/Head w/o Contrast, Imaging Report, General Health Sciences, July 03, 2018 ........ 66

XR/Ankle Right 2-3V, Imaging Report, General Health Sciences, July 03, 2018 ........ 67

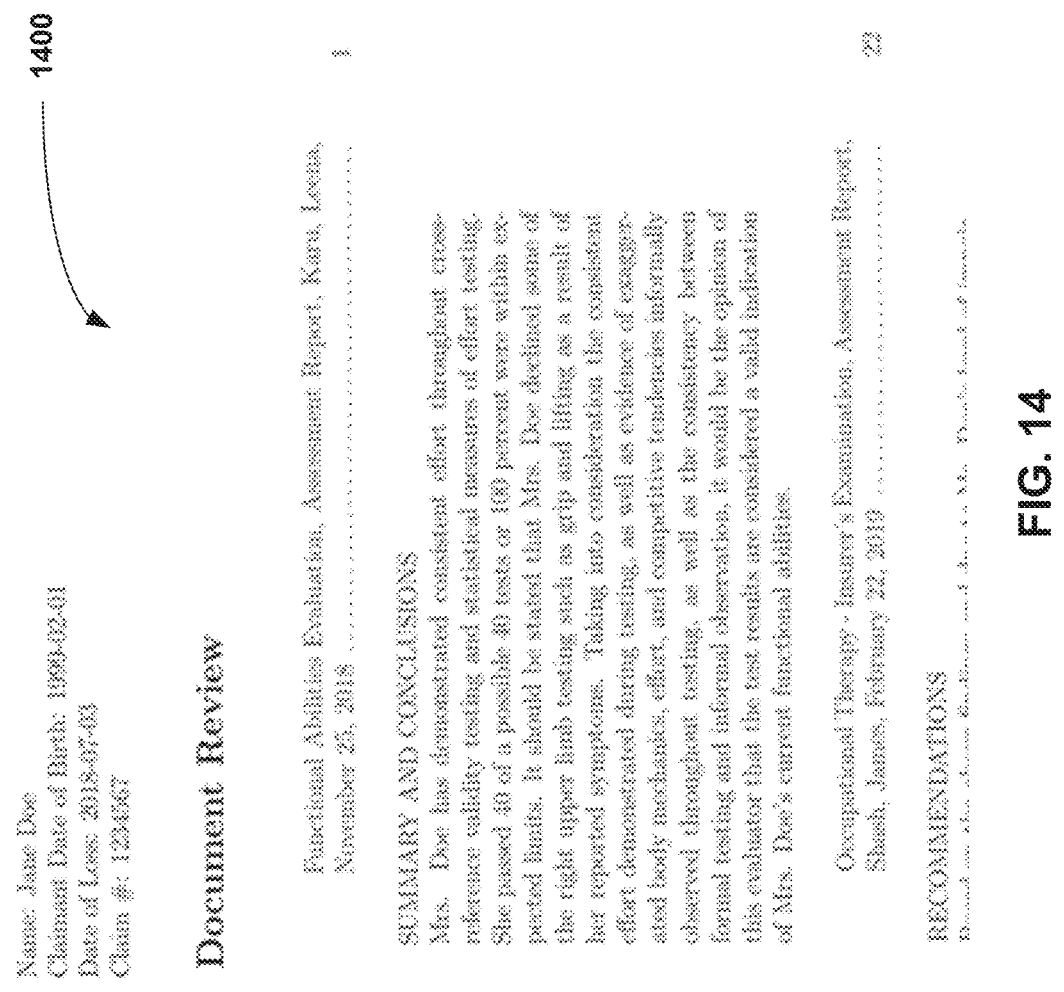

Name: Jane Doe
Claimant Date of Birth: 1990-02-01
Date of Loss: 2018-07-03
Claim #: 1234567

Document Review

Functional Abilities Evaluation, Assessment Report, Karu, Leena, November 25, 2018 .......... 1

SUMMARY AND CONCLUSIONS
Mrs. Doe has demonstrated consistent effort throughout cross-reference validity testing and statistical measures of effort testing. She passed 40 of a possible 40 tests or 100 percent were within expected limits. It should be stated that Mrs. Doe declined some of the right upper limb testing such as grip and lifting as a result of her reported symptoms. Taking into consideration the consistent effort demonstrated during testing, as well as evidence of exaggerated body mechanics, effort, and competitive tendencies informally observed throughout testing, as well as the consistency between formal testing and informal observation, it would be the opinion of this evaluator that the test results are considered a valid indication of Mrs. Doe's current functional abilities.

Occupational Therapy - Insurer's Examination, Assessment Report, Shah, James, February 22, 2019 .......... 23

RECOMMENDATIONS

FIG. 14

SYSTEM AND METHOD FOR AUTOMATED FILE REPORTING

CROSS REFERENCE TO RELATED APPLICATIONS

This application is a continuation of U.S. patent application Ser. No. 17/616,451 filed on Dec. 3, 2021, which is a national stage entry of PCT/CA2020/050782 filed on Jun. 5, 2020, which is a non-provisional of, and claims all benefit, including priority to U.S. Application No. 62/857,930 filed on Jun. 6, 2019, entitled SYSTEM AND METHOD FOR AUTOMATED FILE REPORTING, incorporated herein in its entirety by reference.

FIELD

The present disclosure generally relates to the field of automated reporting, and in particular to a system and method for automated file reporting.

INTRODUCTION

When performing a task that requires the organization of a large file (for example, when assessing an insurance claim, an assessment officer must review the health record of a patient or claimant), the large file may comprise several thousand pages, causing delays or missed information. Sometimes, the files (e.g., health records) may be compiled manually into a report, sometimes with comments from the assessor who prepared the report.

SUMMARY

In accordance with an aspect, there is provided a document index generating system. The system comprises at least one processor and a memory storing a sequence of instructions which when executed by the at least one processor configure the at least one processor to preprocess a plurality of pages into a collection of data structures, classify each preprocessed page into at least one document type, segment groups of classified pages into documents, and generate a page and document index for the plurality of pages based on the classified pages and documents. Each data structure comprises a representation of data for a page of the plurality of pages. The representation comprises at least one region on the page.

In accordance with another aspect, there is provided a computer-implemented method for generating a document index. The method comprises preprocessing a plurality of pages into a collection of data structures, classifying each preprocessed page into at least one document type, segmenting groups of classified pages into documents, and generating a page and document index for the plurality of pages based on the classified pages and documents. Each data structure comprises a representation of data for a page of the plurality of pages. The representation comprises at least one region on the page.

In accordance with an aspect, there is provided a document summary generating system. The system comprises at least one processor and a memory storing a sequence of instructions which when executed by the at least one processor configure the at least one processor to obtain a document, divide the document into chunks of content, encode each chunk of content, cluster each encoded chunk of content, determine at least one central point in each encoded chunk of content, and generate a summary for the document based on the at least one central point for each of the clustered encoded chunk of content.

In accordance with another aspect, there is provided a computer-implemented method for generating a summary of a document. The method comprises obtaining a document, dividing the document into chunks of content, encoding each chunk of content, clustering each encoded chunk of content, determining at least one central point in each encoded chunk of content, and generating a summary for the document based on the at least one central point for each of the clustered encoded chunk of content.

In accordance with another aspect, there is provided a document processing evaluation system. The system comprises obtain a ground truth dataset, generate a ground truth graph using the ground truth dataset having labels, generate a second graph using a processed dataset, and determine a graph similarity score between the second graph and the ground truth graph.

In accordance with another aspect, there is provided a computer implemented method for evaluating a document process, the method comprising obtaining a ground truth dataset, generating a ground truth graph using the ground truth dataset having labels, generating a second graph using a processed dataset, and determining a graph similarity score between the second graph and the ground truth graph.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

Embodiments will be described, by way of example only, with reference to the attached figures, wherein in the figures:

FIG. 5 illustrates, in a screenshot, an example of a portion of a PDF page in a PDF document, in accordance with some embodiments;

FIG. 12 illustrates another example of an index, in accordance with some embodiments;

FIG. 14 illustrates another example of a document summary, in accordance with some embodiments;

It is understood that throughout the description and figures, like features are identified by like reference numerals.

DETAILED DESCRIPTION

Embodiments of methods, systems, and apparatus are described through reference to the drawings.

An automated electronic health record report would allow independent medical examiners (clinical assessors) to perform assessments and efficiently formulate accurate, defensible medical reports. In some embodiments, a system for automating electronic health record reports may be powered by artificial intelligence technologies that consist of classification and clustering algorithms, object character recognition, and advanced heuristics.

Often, a case file may comprise a large number of pages that have been scanned into a portable document format (PDF) or other format. The present disclosure discusses ways to convert a scanned file into an organized format. While files maybe scanned into formats other than PDF, the PDF format will be used in the description herein for ease of presentation. It should be understood that the teachings herein may apply to other document formats.

Figure 1:
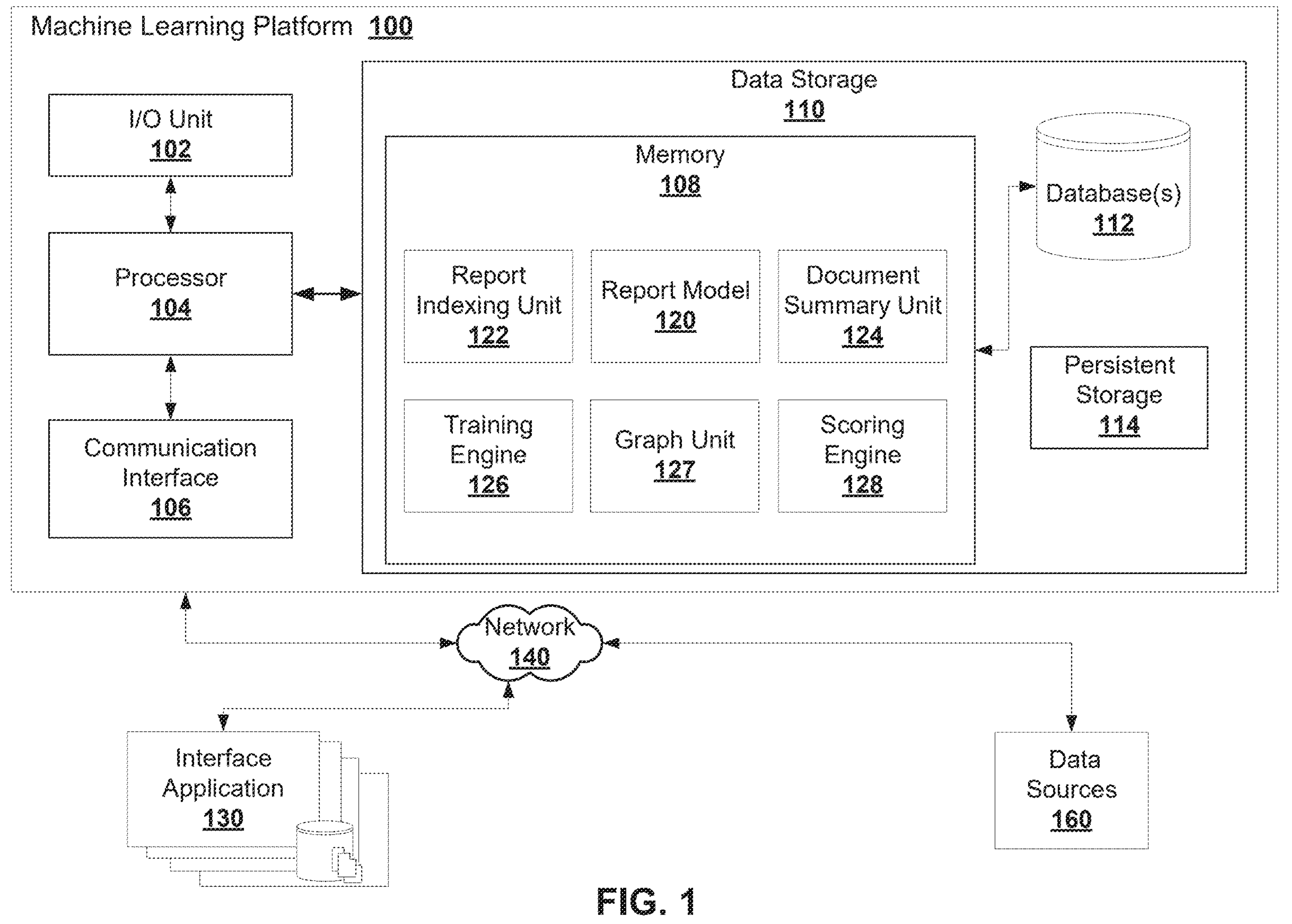
FIG. 1 illustrates, in a schematic diagram, an example of an automated medical report system platform, in accordance with some embodiments.

FIG. 1 illustrates, in a schematic diagram, an example of an automated medical report system platform 100, in accordance with some embodiments. The platform 100 may include an electronic device connected to an interface application 130 and external data sources 160 via a network 140 (or multiple networks). The platform 100 can implement aspects of the processes described herein for indexing reports, generating individual document summaries, training a machine learning model for report indexing and summarization, using the model to generate the report indexing and document summaries, and scoring report indexes and summaries.

The platform 100 may include at least one processor 104 and a memory 108 storing machine executable instructions to configure the at least one processor 104 to receive data in form of documents (from e.g., data sources 160). The at least one processor 104 can receive a trained neural network and/or can train a neural network using a machine learning engine 126. The platform 100 can include an I/O Unit 102, communication interface 106, and data storage 110. The at least one processor 104 can execute instructions in memory 108 to implement aspects of processes described herein.

The platform 100 may be implemented on an electronic device and can include an I/O unit 102, the at least one processor 104, a communication interface 106, and a data storage 110. The platform 100 can connect with one or more interface devices 130 or data sources 160. This connection may be over a network 140 (or multiple networks). The platform 100 may receive and transmit data from one or more of these via I/O unit 102. When data is received, I/O unit 102 transmits the data to processor 104.

The I/O unit 102 can enable the platform 100 to interconnect with one or more input devices, such as a keyboard, mouse, camera, touch screen and a microphone, and/or with one or more output devices such as a display screen and a speaker.

The at least one processor 104 can be, for example, any type of general-purpose microprocessor or microcontroller, a digital signal processing (DSP) processor, an integrated circuit, a field programmable gate array (FPGA), a reconfigurable processor, or any combination thereof.

The data storage 110 can include memory 108, database(s) 112 and persistent storage 114. Memory 108 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 110 can include memory 108, databases 112 (e.g., graph database), and persistent storage 114.

The communication interface 106 can enable the platform 100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The platform 100 can be operable to register and authenticate users (using a login, unique identifier, and password for example) prior to providing access to applications, a local network, network resources, other networks and network security devices. The platform 100 can connect to different machines or entities.

The data storage 110 may be configured to store information associated with or created by the platform 100. Storage 110 and/or persistent storage 114 may be provided using various types of storage technologies, such as solid state drives, hard disk drives, flash memory, and may be stored in various formats, such as relational databases, non-relational databases, flat files, spreadsheets, extended markup files, etc.

The memory 108 may include a report model 120, report indexing unit 122, a document summary unit 124, a machine learning engine 126, a graph unit 127, and a scoring engine 128. In some embodiments, the graph unit 127 may be included in the scoring engine 128. These units 122, 124, 126, 127, 128 will be described in more detail below.

Figure 2:
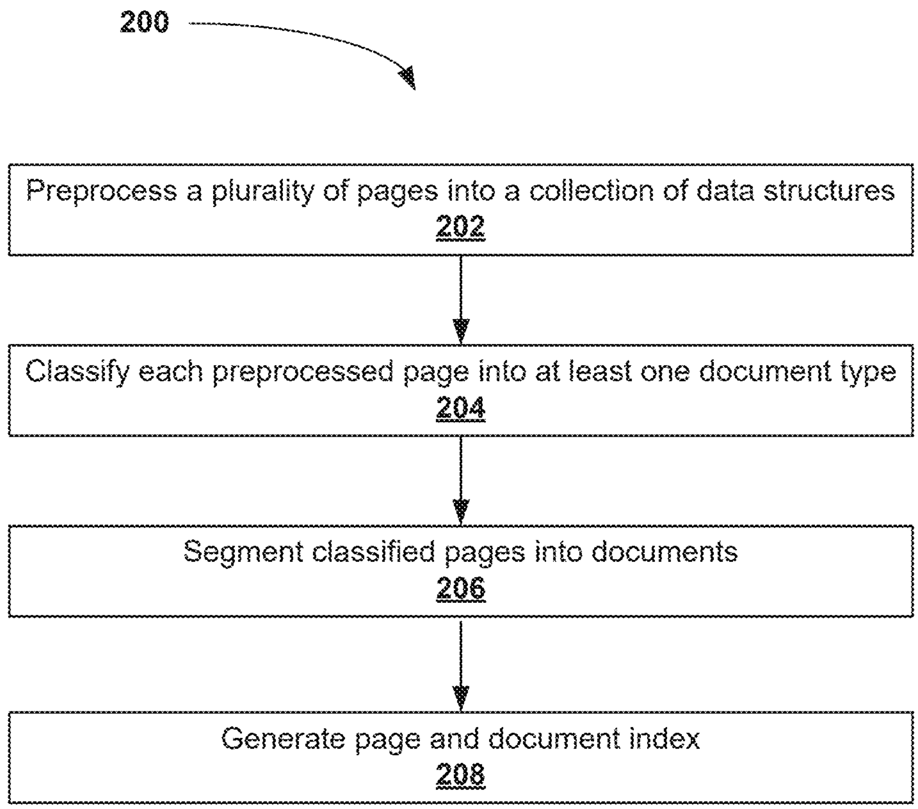
FIG. 2 illustrates, in a flowchart, an example of a method of generating an index of a document, in accordance with some embodiments.

FIG. 2 illustrates, in a flowchart, an example of a method of generating an index of a document 200, in accordance with some embodiments. The method 200 may be performed by the report indexing unit 122. The method 200 comprises preprocessing a plurality of pages into a collection of data structures 202. Each data structure may comprise a representation of data for a page of the plurality of pages. The representation may comprise at least one region on the page. Next, the method 200 classifies each preprocessed page into at least one document type 204. Next groups of classified pages are segmented into documents 206. Next, a page and document index are generated for the plurality of pages based on the classified pages and documents 208. Other steps may be added to the method 200.

Figure 3:
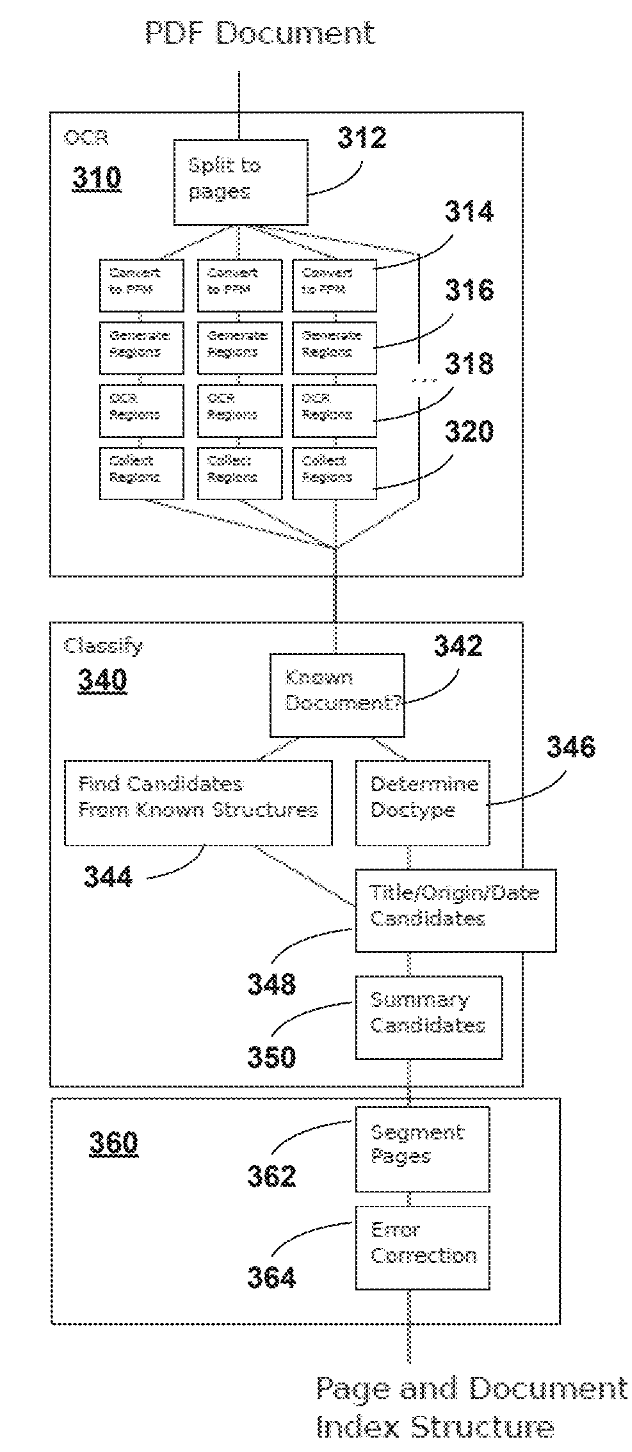
FIG. 3 illustrates, in a flowchart, another example of generating an index of a document, in accordance with some embodiments.

FIG. 3 illustrates, in a flowchart, another example of generating an index of a document 300, in accordance with some embodiments. The method 300 can be seen as involving three main steps: pre-processing 310, classification 340, and report generation 360.

Preprocessing 310

In some embodiments, predictors are identified and established based on a body of knowledge, such as a plurality of document identifiers that identify official medical record types for different jurisdictions. Which document type to assign to a page may be based off of the document/report model 120. The terms document model and report model are used interchangeably throughout this disclosure. The document model 120 may comprise classification, document index generation and document summary generation. The document model 120 will be further described below.

In some embodiments, complex medical subject matter may be identified using advanced heuristics involving such predictors and/or detection of portions of documents. Is should be noted that a heuristic is a simple decision strategy that ignores part of the available information within the medical record and focuses on some of the relevant predictors. In some embodiments, heuristics may be designed using descriptive, ecological rationality, and practical application parameters. For example, descriptive heuristics may identify what clinicians, case managers, and other stakeholders use to make decisions when conducting an independent medical evaluation. Ecological heuristics may be interrelated with descriptive heuristics, and deal with ecological rationality. For example, to what environmental structures is a given heuristic adapted (i.e., in which environments it performs well, and in which it does not). Practical applications parameters as a heuristic identifies how the study of people's repertoire of heuristics and their fit to environmental structures aid decision making.

In some embodiments, these heuristics may be used in a model 120 that uses predictors for optical character recognition (OCR) applications in any jurisdiction or country conducting medical legal practice. A process using OCR may be used that breaks down a record/document by form. A form may be defined as the sum of all parts of the document's visual shape and configuration. In some embodiments, a series of processes allow for the consolidation of medical knowledge into a reusable tool: identification process, search process, stopping process, decision process, and assignment process.

Figure 4:
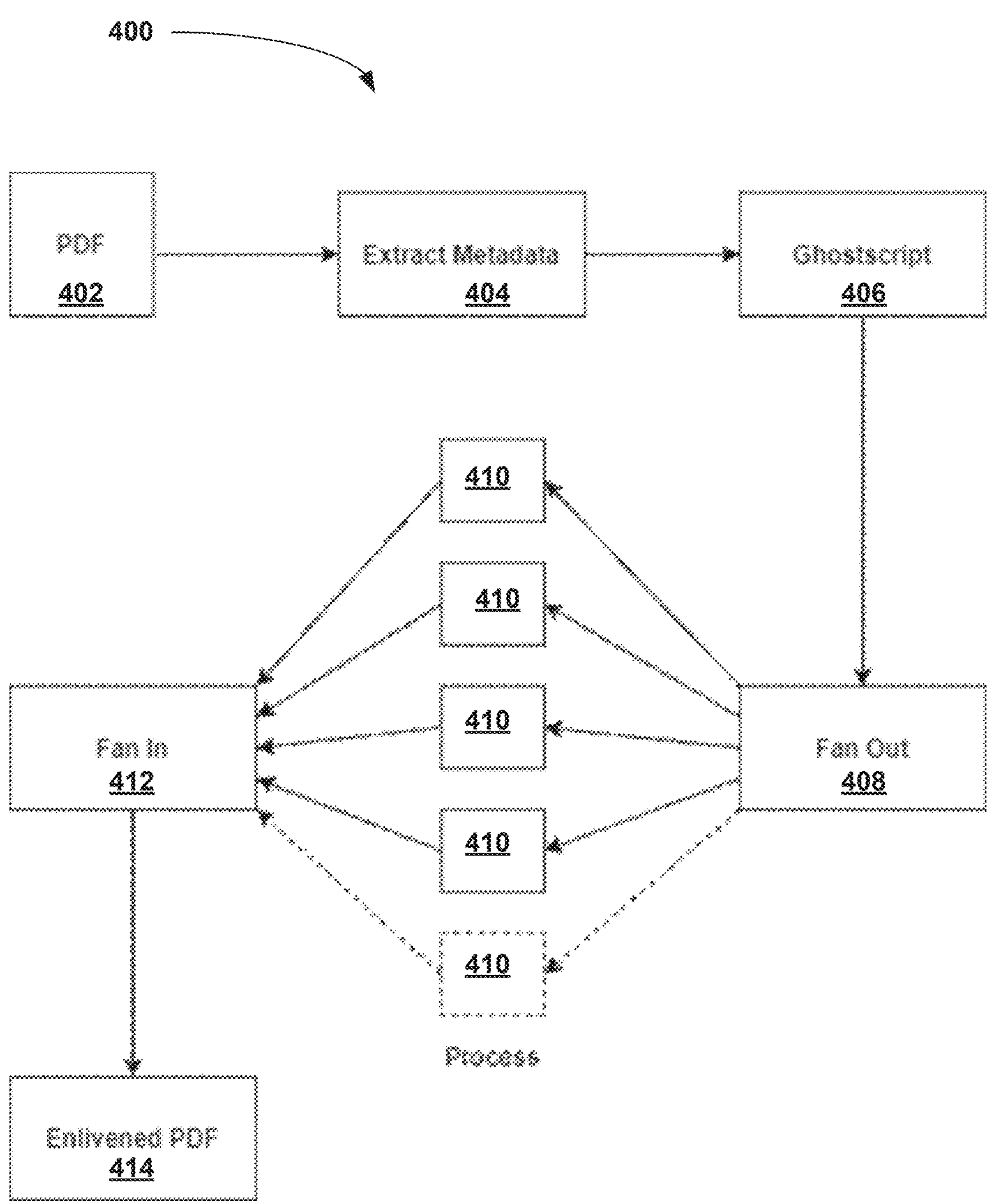
FIG. 4 illustrates, in a process flow diagram, an example of a method of preprocessing a PDF document, in accordance with some embodiments.

In some embodiments, documents (e.g., PDF documents or other documents) may preprocessed such that content (e.g., text, images, or other content) is extracted and corrected, a search index is build, and the original imaged-PDF is searchable. FIG. 4 illustrates, in a process flow diagram, an example of a method of preprocessing 400 a PDF document, in accordance with some embodiments. A PDF document 402 is an input which may be "live" or it may contain bitmap images of text that need to be converted to text using OCR. Metadata may be extracted 404 from the PDF document 402. For example, the bookmark and form data may be extracted 404 from the PDF 402. In some embodiments, the extracted data may be save for future reference. Next, the PDF 402 may be passed through a rendering (such as, for example, 'Ghostscript') function 406, to minimize its file size and reduce the resolution of any bitmaps that might be inside. This will allow for the PDF to be displayed more easily in a browser context. Next, the PDF 402 is divided into smaller "chunks" (i.e, Fan Out 408), each of which can be processed in parallel. This is useful for larger files, which will be processed much more quickly this way than working on the entire file at once. Each PDF chunk is enlivened 410. For example, this may involve using a conversion tool such as 'OCRmyPDF' to OCR any bitmaps present and embed the result into the PDF chunk. Once all the chunks have been processed, they may be stitched back together (i.e., Fan In 412) in order to provide the output. The output of this process is a fully live, (i.e., enlivened) PDF 414 (rather than a potentially live one).

In some embodiments, an identification process identifies predictors. Predictors may be manually assigned to pertinent data points in the document based on location, quadrant, area, and region. The selection of predictors may be completed by clinical professionals based on experience, user need, medical opinion, and medical body of knowledge. In some embodiments, predictors may be determined and known document patterns and context of pages.

In some embodiments, a search process may involve searching a document for predictors and/or known patterns. For known document types, a specific region may be scanned. For unknown document types, all regions of the document may be scanned to detect the predictors and/or known patterns; such scanning may be performed in the order of region importance based on machine learning prediction results for potential document type categories.

In some embodiments, a stopping process may terminate a search as soon as a predictor variable can identify a label with a sufficient degree of confidence.

In some embodiments, a decision process may classify a document according to the located predictor variable.

In some embodiments, in an assignment process, predictors are given a weight based on importance.

With knowing what to look for (predictors), how to look for it (heuristic), and how to score it by relevance and application, classification algorithms can then accurately identify key pieces of medical information that is relevant to a medical legal user.

Referring back to FIG. 3, classification 340 of a specific form may begin with the OCR 310 of each page to identify specific regions within each page to maximize the identification of certain forms. Forms are the visible shape or configuration of the medical record by page. Typically, forms comprise the following sub regions: a top third region, a middle third region, a bottom third region, a top quadrant region, a bottom 15% region, a bottom right hand corner region, a top right hand corner region, and a full page region. Scanning each sub region provides a better understanding of the medical document and what is to be extracted for the clustering algorithm. The output of this ORC 310 step provides texts of these regions to be processed. The types of data that are used are identifiable and each form can be standardized to allow for accurate production of the existing output on a reoccurring basis. The topology and other features of standardized forms may be included in the document model 120.

The OCR step 310 comprises preprocessing a plurality of pages into a collection of data structures where each data structure may comprise a representation of data for a page of the plurality of pages. The presentation may comprise at least one region on the page. In some embodiments, the OCR 310 step comprises separating a received document (or group of documents comprising a file) into separate pages 312. Each page may then be converted to a bitmap file format 314 (such as a greyscale bitmap, a portable pixmap format (PPM) or any other bitmap format). Regions of interest may also be determined (i.e., generated or identified) on each page 316 to be scanned. For example, the system may look at all possible regions on a page and determine if an indicator is present in a subset of the regions. The subset of regions that include an indicator may comprise a signature of the type of form to which the page is a member.

The regions may then be converted into machine-encoded text (e.g., scanned using OCR) 318. The regions and corresponding content (e.g., text, image, other content) may be collected 320 for each page into a data structure for that page. In some embodiments, the structure of data for each page represents a mapping of region to content (e.g., text, image, etc.) for each page. Each page data structure may then be merged together (e.g., concatenated, vectored, or formed into an ordered data structure) to form a collection of data structures. It should be noted that steps 314 to 320 may be performed in sequence or in parallel for each page.

Classification 340

The collection of data structures generated as the output to the OCR/pre-processing step 310 may be fed as input to a classification process 340. The classification process 340 involves the classification of a specific region by a candidate for type. If the document is of a known type 342, then candidates from known structures are located 344. For example, each page is compared with known characteristics of known document types in the model 120. Otherwise 342, the document type is to be determined 346. For example, a feed forward neural network may be trained (using machine learning engine 126) on label corpus of document types to page contents. In some embodiments, a multi-layered feed forward neural network may be used to determine the most likely document type (docType). In some embodiments, the average of word to vector (word2vec) encodings of all the words in a page may be used as input, and the network outputs the most likely docType. In some embodiments, a bidirectional encoder representations from transformers (BERT) language model may be used for the classification. It should be noted that the neural network may be updated automatically based on error correction 364. For example, parameters in the BERT and/or generative pretraining transformer 2 (GPT-2) algorithms may be fine-tuned with customized datasets and customized parameters. This will improve performance. Summarization of documents using such language models may be controlled with a weighted customized word lists and patterns. For example, more weight may be give to words or phrases such as 'summary', 'in summary', 'conclusion', 'in conclusion', etc. Patterns may include placement of structure or fragments of text and/or images (or other content) that follow or accompany the words or phrases. For example, FIG. 5 illustrates, in a screenshot, an example of a portion of a PDF page 500 in a PDF document 402, in accordance with some embodiments. The page 500 includes a word 'IMPRESSION:' 502 followed by a pattern of content 504 that represents a diagnosis or impression. In this example, the impression is "Clear lungs without evidence of pneumonia." However, it should be understood that any other diagnosis or impression may be found. It should also be noted that content pattern 504 (e.g., text and/or images and/or other content) does not have to be next to the words 502. The content pattern 504 can be anywhere that is "predictable" in that there is a known pattern for a document type when that word 502 is found, such that the location of the relevant text and/or images are known/predictable. Other examples of words that may be part of a word list in this example include "COMPARISON:", "INDICATION:" and "RECOMMENDATION:".

Candidates (from the document model 120) may comprise headers, document types, summary blocks, origins (people and facility), dates, and page information/identifiers. These candidates are identified and categorized 348. For example, the region data that was received is traversed to select the candidates for each category and assign a candidate score. In some embodiments, a candidate score is a collection of metrics according to clinical expertise. For example, given a block of content, how likely this block of content is what is being searched for is determined. This analysis will provide a title score, a date score, etc. The items that are most likely will be observed in each category. The title/origin/date/etc. candidate items are scored then sorted according to score into a summary 350. Once the candidate items are scored, a key value structure is determined and passed to the clustering step 360 using clustering algorithms. In some embodiments, the structure passed from the classification step 340 to the clustering step 360 comprises a sequence of key/value maps that includes an 'index' value (e.g., the integer index of the given page in the original document), one or more 'regions' values (e.g., the region data extracted via OCR process 318), and 'doc_type' (or 'docType'), 'title', 'page', 'date', 'origin' and 'summary' values (e.g., ordered sets of candidates of each property descending by correctness likelihood).

Figure 6A:
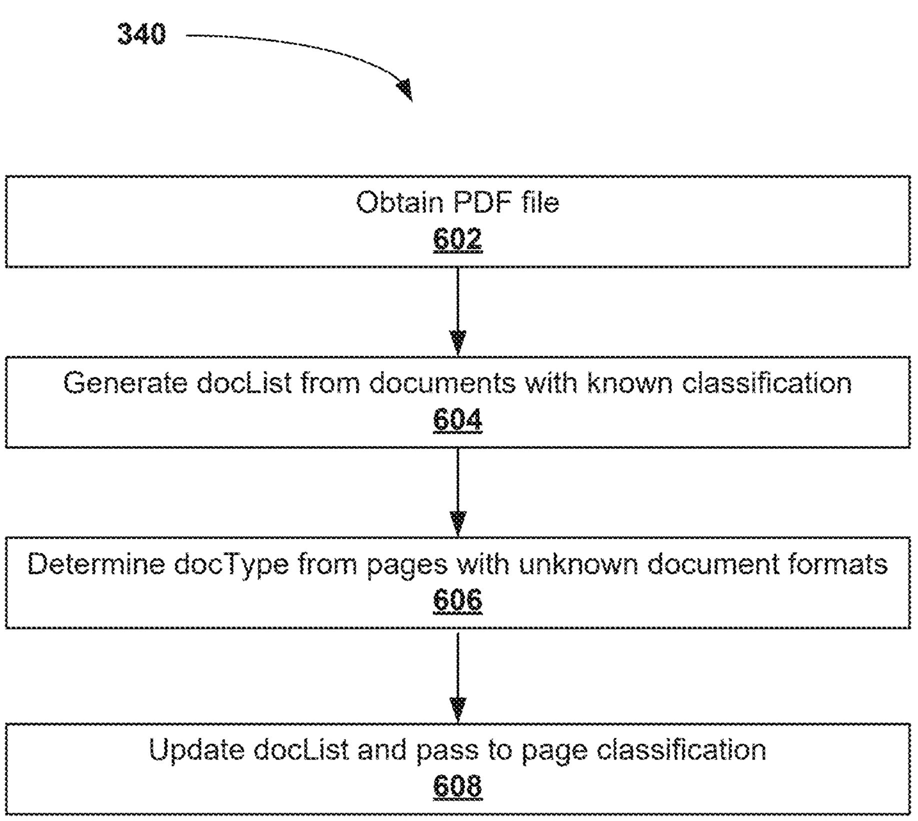
FIG. 6A illustrates, in a flowchart, another example of a method for classifying pages, in accordance with some embodiments.

FIG. 6A illustrates, in a flowchart, another example of a method for classifying pages 340, in accordance with some embodiments. The method 340 begins with obtaining a PDF file 602. For a given PDF file, a known_docs classifier processes and extracts all pages with known document formats 344 (from document model 120), and from these pages further extracts their meta information (e.g., title, origin/author, date, summary, etc. 348, 350). A docList is generated 604 with pages that are extracted with meta information and with pages that are not extracted (i.e., pages that did not match with a known document format in the document model 120). The docList is passed to a docType classifier where pages with empty docType information are processed 606. A docType from pages with unknown document formats is obtained, and the docList is updated and passed 608 to page classification. Page classification will predict candidates for meta information (e.g., title, origin/author, date, summary, etc. 348, 350) for pages of unknown document types.

Figure 6B:
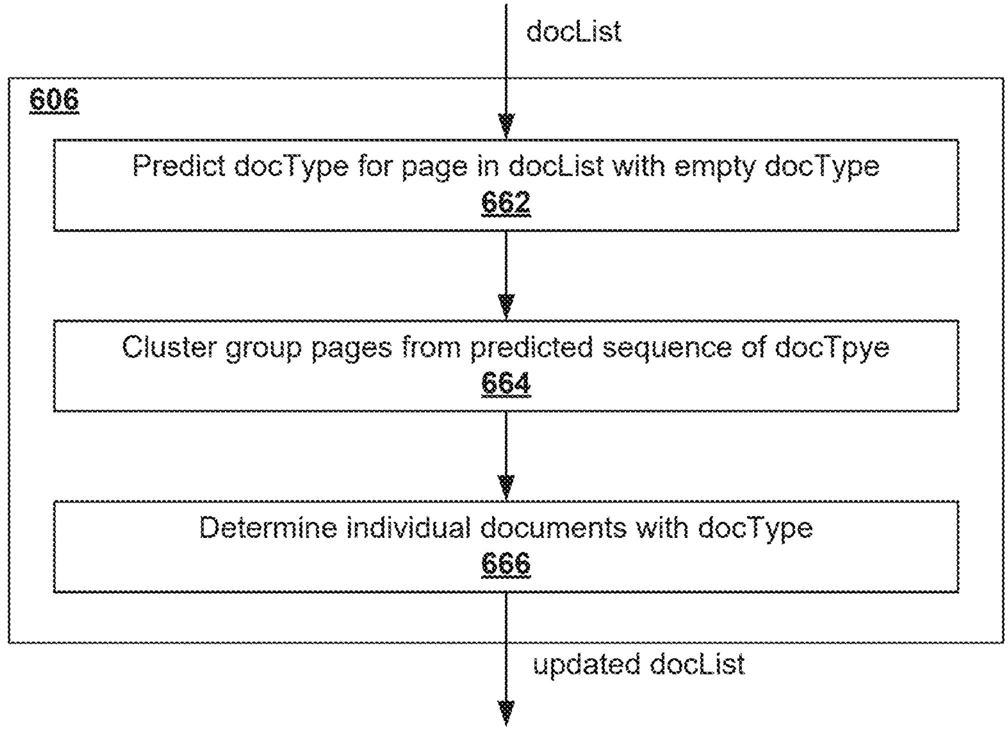
FIG. 6B illustrates, in a flowchart, an example of a method for determining a document type from pages with unknown document formats, in accordance with some embodiments.

FIG. 6B illustrates, in a flowchart, an example of a method for determining a docType from pages with unknown document formats 346, 606, in accordance with some embodiments. The method 346, 606 begins with predicting 662 a docType for each page in docList with empty docType. In some embodiments, predicting involves generating candidate meta information 348, 350, using the trained model 120 for key words and patterns that are likely for a document type (docType). Typically, the document type with the highest likelihood is used. In some embodiments, the machine learning engine ingests pages in its neural network, outputs the probabilities of all possible document types, and selects the docType with the highest probability as the docType of the pages. After processing all pages, a sequence of docTypes with page number is generated. If some docType is predicted for a page, then this page is labeled as the first page of that document. If no docType is obtained, then the page is not the first page. From the predicted sequence of docTypes group pages are clustered 664 into different documents with docTypes. In some embodiments, clustering 664 involves grouping similar pages (based on a vector which will be further described below) into one document. Thus, individual documents with docType are determined 666.

For example, suppose that the predicted sequences of docTypes is:

(5,report), (6,none), (7,none), (8,assessment), (9,none), (10,image), (11,none), (12,none).

This predicted sequence represents that patterns were found on page 5 that suggest that the most likely docType for page 5 is a report, patterns were found on page 8 that suggest that the most likely docType for page 8 is an assessment, and patterns were found on page 10 that suggest that the most likely docType for page 10 is an image. In this example, no patterns were found for pages 6-7, 9 or 11-12. In some embodiments, a minimum threshold of likelihood (e.g., 50% or another percentage) may be used to distinguish between a pattern likelihood worthy of labelling a docType and a pattern likelihood too low to label a docType for a page.

Pages with "none" (i.e., where no docType has been predicted thus far) that follow a page having a predicted docType can be inferred to be of that same docType. Thus, for pages 5-12, it can be concluded that pages 5-7 is a report, pages 8-9 is an assessment, and pages 10-12 is an image. In some embodiments, pages 5 to 7 may be encoded to represent a document, pages 8 and 9 encoded to represent an assessment, and pages 10 to 12 encoded to represent an image. The three individual documents may then be processed separately by the page classifier to predict the missing meta information.

Clustering 360

Referring back to FIG. 3, pages may be segmented (i.e., grouped into document types) 362. Using the raw data (e.g., title, author/origin, date, etc. obtained in the classification 340), list of candidates and collected candidate summaries, the pages are analyzed and associated with each other where possible. For example, pages may be grouped together based on similar document types, similar titles, sequential page numbers located at a same region, etc. It has been observed that the strongest associations involve document title, groups, and pages. For example, some pages have recorded page numbers (such as "1 of 3" or "4 of 7" or "1/12"). If contiguous pages are located that all report the same total page count, and no conflicting page numbers, they are likely to be grouped (for instance, if pages are located in sequence that are labelled as "1 of 5", "2 of 5", "3 of 5", "4 of 5", "5 of 5", then they are very likely to constitute a group).

Once pages are segmented 362, an initial grouping of characteristics by page and by document is provided. Error correction 364 may take place to backfill missing data from the previous step (e.g., a missing page number). Errors are identified and adjusted by a clustering algorithm. In some embodiment, based on the information in the key value structure, groups of pages that are together (diagnostics, etc.), groups of relevant content based on scoring, and groups of relevant forms can all be identified.

For example, there may be 3 pages in row and perhaps the middle page number is mangled (e.g., fuzzy scan, page out of order, unexpected or unreadable page number). An inference may be created based on what is missing. Pages to which no grouping was assigned may be analyzed. In some embodiments, there is a manual tagging system (using supervised learning) that can assign attributes such as title, author, date, etc. to documents.

The machine will compare the BERT or Word2Vec generated vectors of mangled page with other pages' vectors, and group this page into the group with most relevance. Also, page number could be used for assistance when a group misses a page. If metadata is missing from a page, then the machine can extract the information (such as author, date, etc.) using natural language process tools such as name-entity recognition. A confidence may then be assigned to each metadata according to its page number in the group.

If a title, page number, or any other characteristic is missing for an ungrouped page, but all other characteristics are the same for a grouping, then there is a confidence score that can be assigned to that page to be inserted/added to the grouping. Pages with low confidence may be trimmed from a grouping for manual analysis. Stronger inferences may be obtained with "cleaned" data sets. For example, pages with low confidence may be reviewed for higher accuracy. In some embodiments, a threshold confidence level may be defined for each class/category of document having a low confidence score. Such results may be used to train the model 120.

Once groups of data are smoothed out and organize, the data may be fed into a document list generation function to output a page and document index structure (e.g., docList). In some embodiments, document list generation comprises i) completing a candidate list and indexing the candidates, ii) generating a document structure/outline based on the likeliest page, date, title, and origin, iii) creating a list generator which feeds off of the clustering algorithm and itemizes a table of contents (i.e., after clustering all pages into documents and extracting all meta information for these documents, then these meta information and page ranges of documents can be listed in a table of contents), and iv) taking the table of contents and converting it into a useable document format for the user (i.e., adding the generated index/table of contents to the original PDF file).

Figure 7:
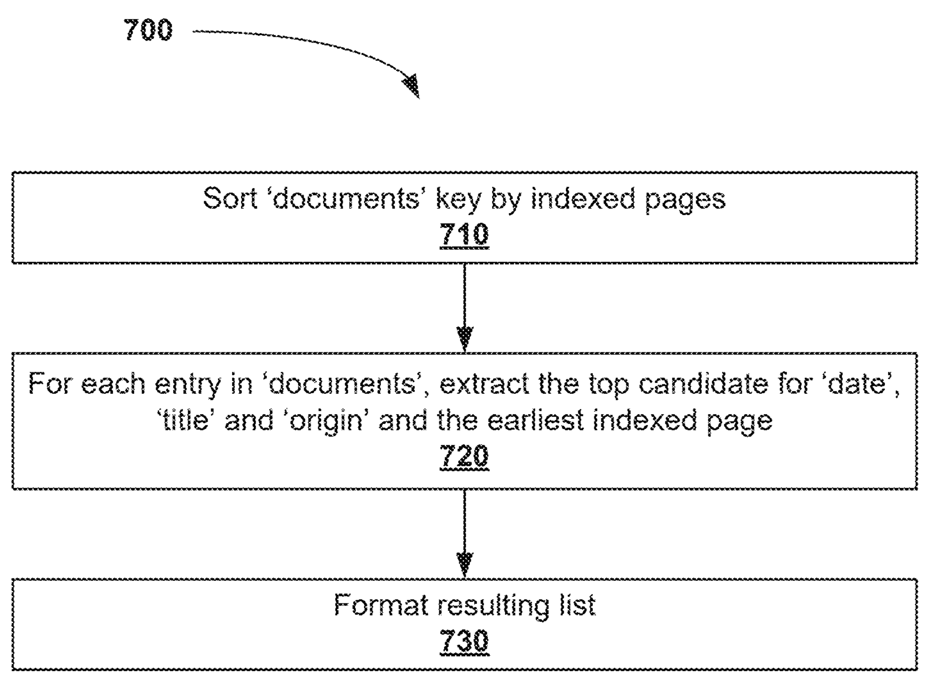
FIG. 7 illustrates, in a flowchart, an example of a method of generating an index (or a table of contents) from the output of the classification component, in accordance with some embodiments.

FIG. 7 illustrates, in a flowchart, an example of a method of generating an index (or a table of contents) 700 from the output of the classification component, in accordance with some embodiments. The method comprises sorting the 'documents' key by indexed pages 710, extracting the top candidate for 'date', 'title' and 'origin', and the earliest indexed page for each entry in 'documents' 720, and formatting the resulting list 730 (for example as a PDF, possibly with hyperlinks to specified page indices). Other steps may be added to the method 700.

In some embodiments, the system and methods described above use objective criteria to remove an individual's biases allowing the user to reduce error when making a decision. Decision making criteria may be unified across groups of users improving the time spent on the decision-making process. Independent medical evaluation body of knowledge may be leveraged to enhance quality, accuracy, and confidence.

In some embodiments, the document summary unit 124 may comprise a primitive neural-net identifier of the same sort as that used on title/page/date/origin slots. In some embodiments, a natural language generation (NLG)-based summary generator may be used.

In some embodiments, a process for identifying how a medical body of knowledge is synthesized and then applied to a claims process of generating a medical opinion is provided.

In some embodiments, a sequence of how a medical document is mapped and analyzed based on objective process is provided.

In some embodiments, a method for aggregating information, process, and outputs into a single document that is itemized and hyperlinked directly to the medical records is provided.

In some embodiments, an automated report comprises a document listing, and a document review/summary. A detailed summary of the document list may include documents in the individual patient medical record that are identified by document title. In some embodiments, the documents (medical records) are scanned (digitized) and received by the system. These medical records are compiled into one PDF document and can range in size from a few pages (reports) to thousands of pages. The aggregated medical document PDF is uploaded into an OCR system. The OCR system uses a model to map specific parts of the document. The document is mapped and key features of that document are flagged and then aggregated into a line itemized list of pertinent documents. The document list is then hyperlinked directly to the specific page within the document for easy reference. The list can be shared with other users.

Once a set of PDF pages are categories into a list of documents, each document may be summarized. There are different approaches to summarizing a given document, including extractive summarization and generative summarization. Extractive summarization is different from generative summarization. Extractive summarization will extract import sentences and paragraphs from a given document, where no new sentences are generated. In contrast, generative summarization will generate new sentences and paragraphs as the summary of the document by fully understanding the content of the document. Extractive methods will now be discussed in more detail, including K-means clustering based summarization (see FIG. 8A), and relational graph based summarization (see FIG. 9).

Clustering may be applied for extractive summarization by finding the most important sentences or chunks from the document. In some embodiments, BERT-based sentence vectors may be used. Graph-based clustering may be used to determine similarities or relations between BERT-based vectors and encoded sentences or "chunks" of content. In some embodiments, BERT-based vectors may be used to assist with computing the graph community and extracting the most important sentences and chunks with a graph algorithm (e.g., PageRank).

Generative summaries may be created using a graph-based neural network trained over a dataset. Summaries such as GPT-2 may be generated. It should be noted that other GPT models may be use, e.g., GPT-3.

Figure 8A:
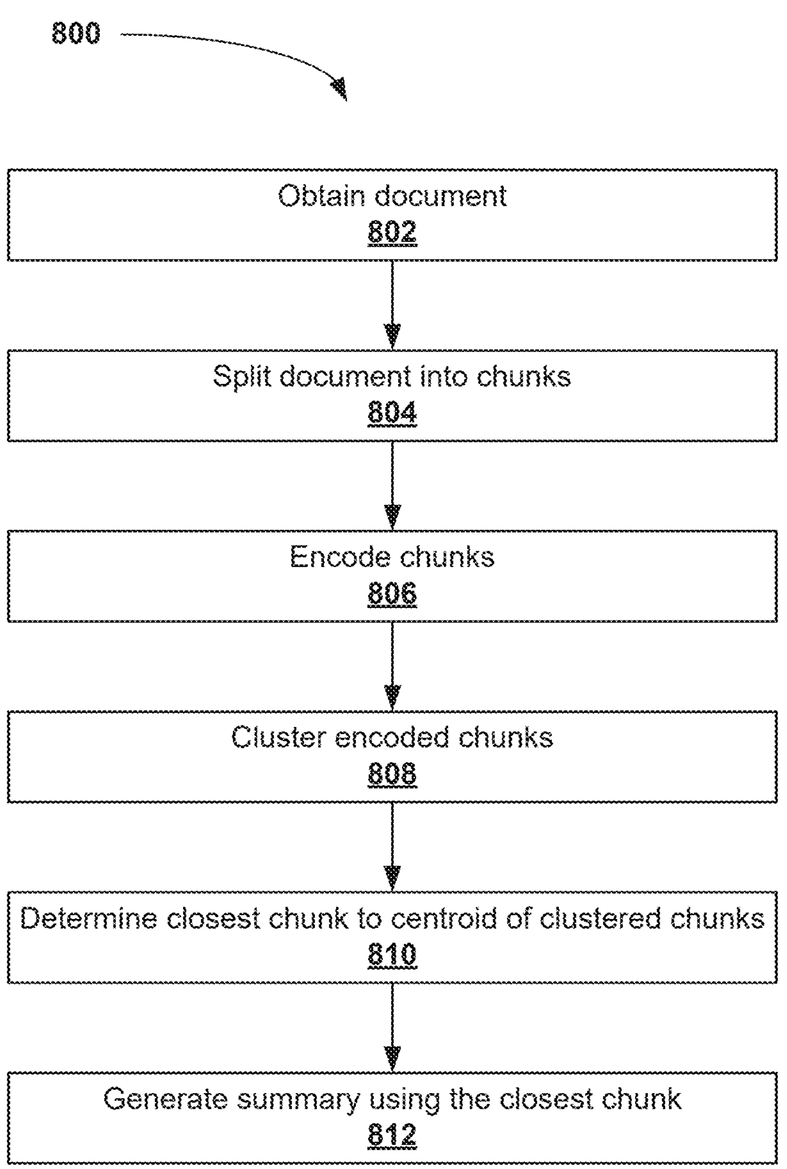
FIG. 8A illustrates, in a flowchart, an example of summarizing a document, in accordance with some embodiments.

FIG. 8A illustrates, in a flowchart, an example of a method of summarizing a document 800, in accordance with some embodiments. The method 800 may be performed by the document summary unit 124. The method 800 obtaining a document 802, dividing or splitting the document into groupings of content (i.e., "chunks") 804, encoding the chunks into a natural language processing format (e.g., word2vec or BERT-based vectors) into the chunks 806, clustering the encoded chunks 808 into groupings based on their encodings, determining the most central points (e.g., closest chunk to the centroid of the clustered chunks) 810 of the clustered chunks, and generating a summary 812 for the document based on the most central points (e.g., closest chunk) Other steps may be added to the method 800. It should be noted that a "chunk" comprises a group of content such as, for example, a group of sentences and/or fragments, whether continuous or not in the original document.

The method 800 will now be described in more detail. In some embodiments, K-means clustering may be used in the method 800. For example, a plain text document may be received as input 802 (which could be the OCR output from a PDF file, or image file). Next, the document can be divided or split into chunks.

Figure 8B:
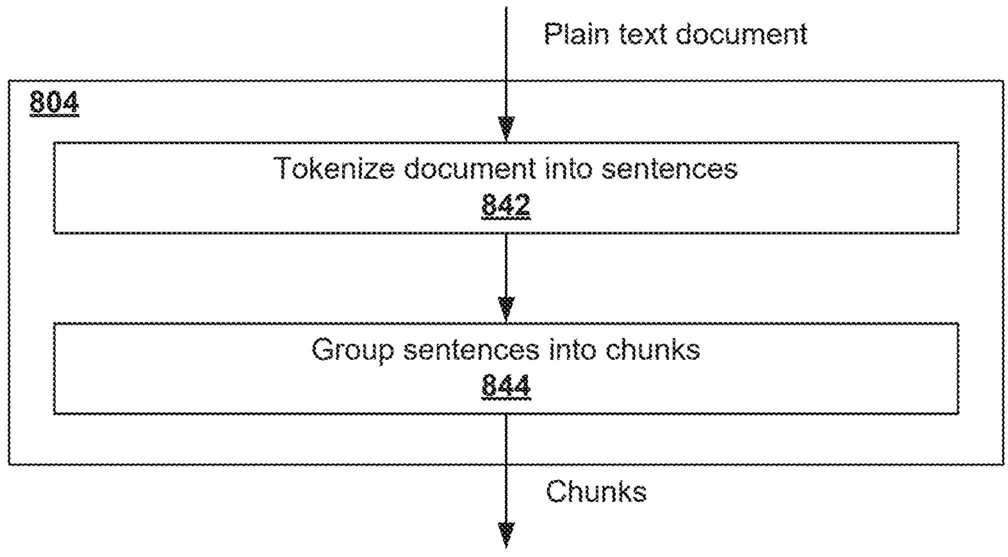
FIG. 8B illustrates, in a flowchart, a method of chunk splitting, in accordance with some embodiments.

FIG. 8B illustrates, in a flowchart, a method of dividing a document into chunks 804, in accordance with some embodiments. Suppose the atom of summarization is a sentence. With natural language processing tools, the plain text document 802 may be tokenized 842 into sentences, and chunks of content are built 844 upon these sentences 804. There are many ways for the system to generate chunks. One way is to tokenize the document into sentences or fragments, and group the number of sentences or fragments by their indices. Another way to group a number of sentences and/or fragments by their correlation/relation/relevance (e.g., two or more fragments or sentences comprise a chunk). It should be noted that a different number of fragments and/or sentences can comprise a chunk. In some embodiments, differently sized chunks may be defined for different document types. It should be noted that a chunk may comprise one or several sentences and fragments (or other types of content) whether or not they are continuous or in order from the original document. Other steps may be added to the method 804.

Referring back to FIG. 8A, BERT or other vectorizing or natural language processing methods may be applied to each chunk 806. Each chunk will be converted into a high dimensional vector. BERT and Word2Vec are two approaches that can convert words and sentences into high dimensional vectors so that mathematical computation can be applied to the words and sentences. For example, the system may generate a vocabulary for the entire context (based on trained model), and input the index of all words of sentences/chunks in the vocabulary to a BERT/Word2Vec based neural network, and output a high dimensional vector, which is the vector representation of the chunk. The dimension of the vector may be predefined by selecting the best tradeoff between speed and performance.

In some embodiments, a vocabulary may comprise a fixed (not-necessarily alphabetical) order of words. A location may comprise a binary vector of a word. If a chunk is defined to be (X-ray, no fracture seen, inconclusive), and vocabulary includes the words "X-ray", "fracture", and "inconclusive", then the corresponding vector for the chunk would be the average of the binary locations for "X-Ray", "fracture", and "inconclusive" in the vocabulary.

In some embodiments, the neural network may input chunks and generate vectors. Using K-means clustering (or other clustering methods), the set of high dimensional vectors may be clustered into different clusters 808. I.e., by looking at the distance between vectors of chunks, the algorithm may dynamically adjust groups and their centroid to stabilize clusters until an overall minimum average distance is achieved. The distance between high-dimensional vectors will determine the vectors that form part of that cluster. N clusters may be predefined where N is the length of the summary for the document. For each cluster generated in step 808, the vector that is closest to the centroid of the cluster 810 is used. In some embodiments, a cosine distance may be calculated to determine the distance between vectors. The closest N vectors could also be used rather than just the closest vector to the center of the centroid. It should be noted that N could be preset by a user, and that there can be a different value for N for different docLists. If a longer summary is desired, then a larger N may be chosen. By mapping the closest vectors back to their corresponding chunk, those chunks may be joined to generate the summary 812 of the document.

Figure 9:
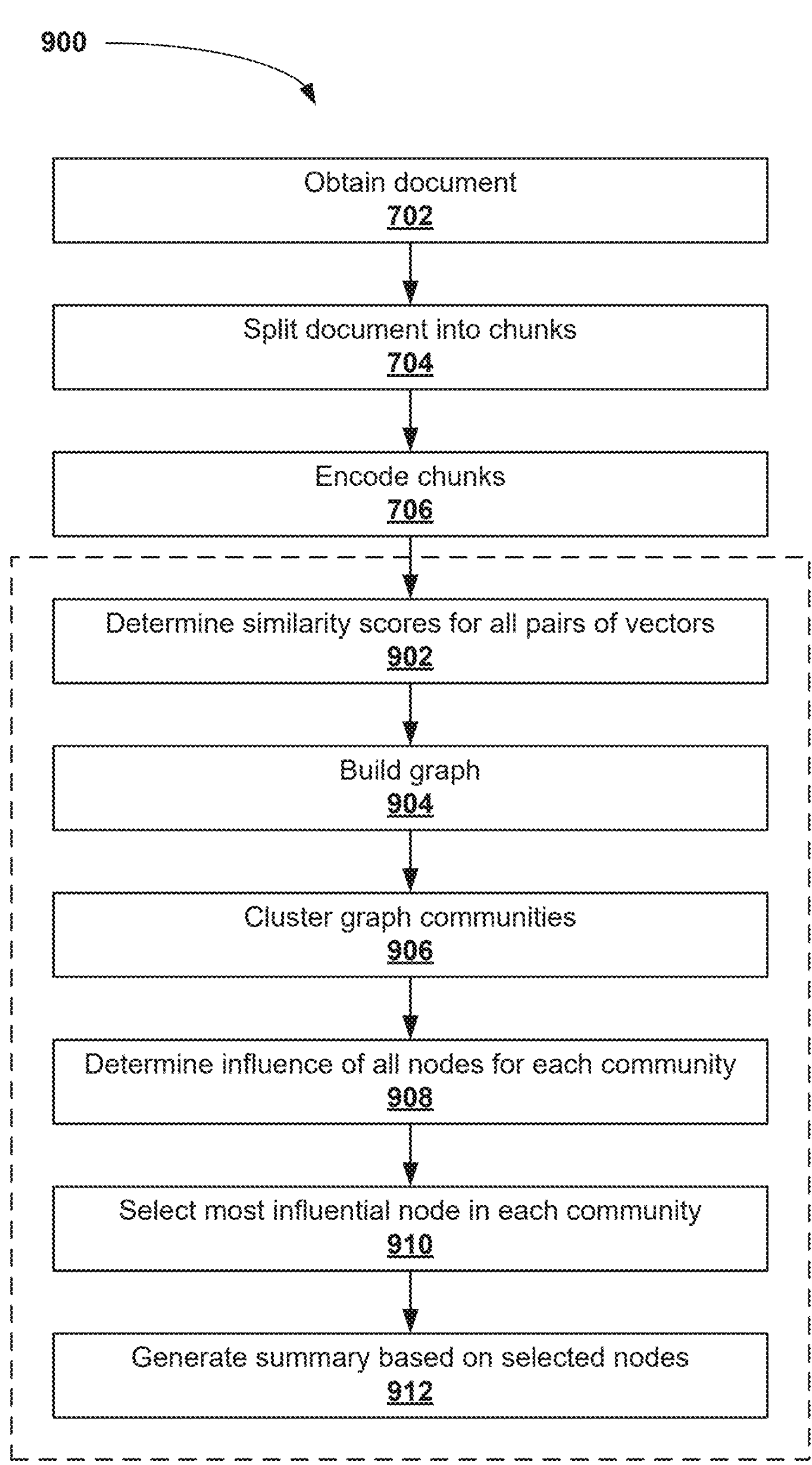
FIG. 9 illustrates, in a flowchart, another method of summarizing a document, in accordance with some embodiments.

FIG. 9 illustrates, in a flowchart, another method of summarizing a document 900, in accordance with some embodiments. The first three steps 802, 804 and 806 of this approach are the same as that of the method described in FIG. 8A (for which K-means clustering is used in some embodiments). After obtaining the vectors for the chunks 806, a similarity calculation 902 may be used to determine or compute all similarity scores between all pairs of vectors (e.g., using a cosine metric). For each pair of vectors, if their similarity score is greater than a predefined threshold, then the two vectors are connected. Otherwise there is no connection between those two vectors. In this way, a graph is built 904 with vectors as the nodes, and connections as the edges. Clustering over the graph 906, a set of subgraphs called communities are generated where within each community all nodes are closely connected. In some embodiments, the nodes are considered to be closely connected when they have high relevance scores and more connections. The higher the relevance score between sentences, the more likely those sentences are connected. For each community, influence of all nodes may be determined 908. The most influential node may be defined as the node that has the most number of connections with all other nodes within the community, and these connection have high similarity scores as well. Next, the nodes of the community may be sorted by influence, the node with the most influence 910 may be selected to represent that community. The selected or chosen nodes or vectors may be mapped back to their corresponding chunks of content. The corresponding chunks of content may then be joined to form the summary of the document 912. Other steps may be added to the method 900.

Figure 10:
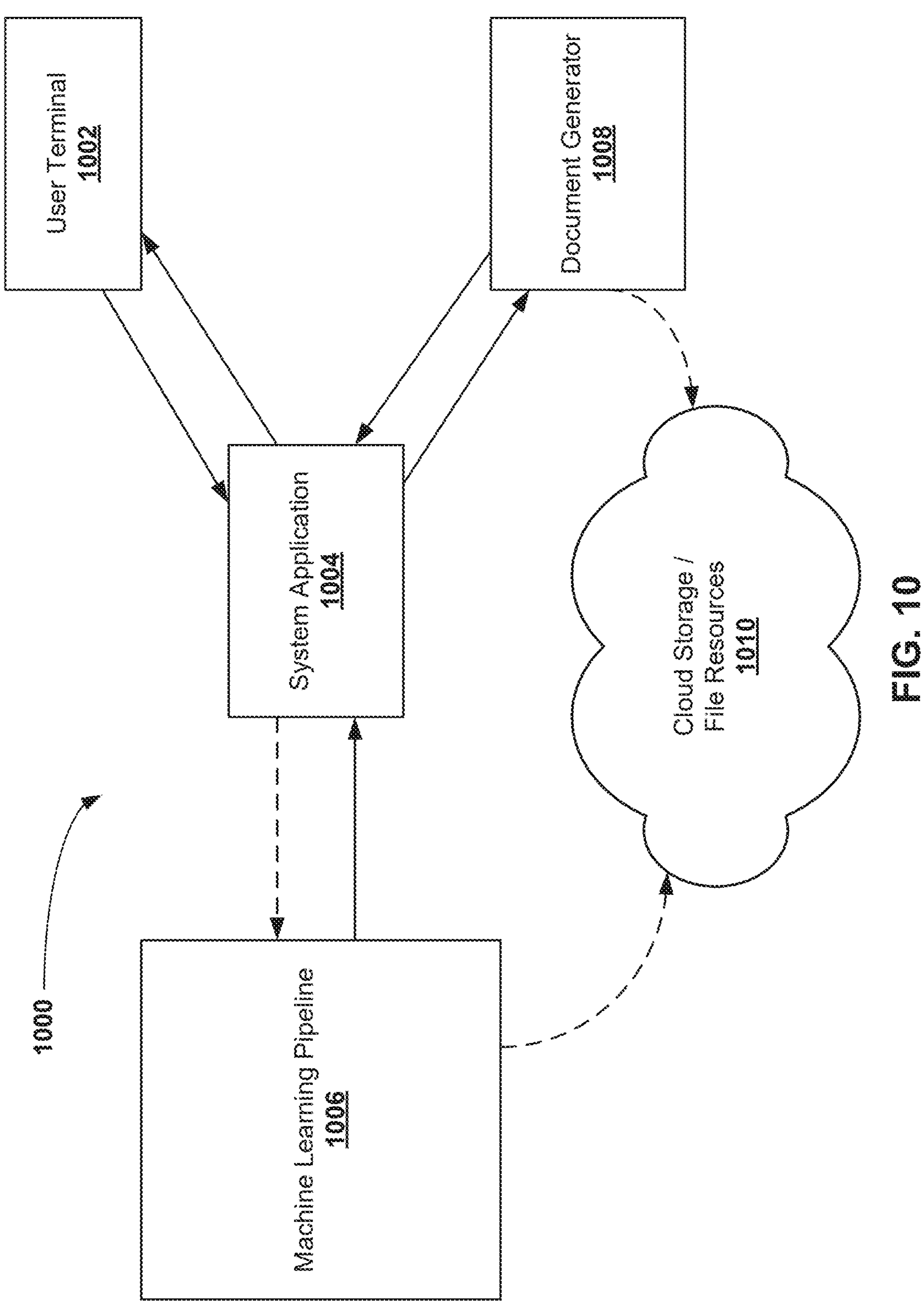
FIG. 10 illustrates, in a schematic, an example of a system environment, in accordance with some embodiments.

FIG. 10 illustrates, in a schematic, an example of a system environment 1000, in accordance with some embodiments. The system environment 1000 comprises a user terminal 1002, a system application 1004, a machine learning pipeline 1006, a document generator 1008, an a cloud storage 1010. In some embodiments, the user terminal 1002 does not have direct access to internal services. Such access is granted via system application 1004 calls. The system application 1004 coordinates interaction between the user terminal 1002 and the internal services and resources. Permissions to the file resources/memory storage may be granted to software robots on a per use basis.

In some embodiments, the system application 1004 may be a back-end operation implemented as a Python/Django/Postgres application that acts as the central coordinator between the user and all the other system services. It 1004 also handles authentication (verifying a user's identification) and authorization (determining whether the user can perform an action) to internal resources. All of the system application 1004 resources are protected, which includes issuing the proper credentials to internal robot/automated services.

Some resources that may be created by the system application 1004 include User Accounts, Cases created, and Files uploaded to the Cases. After an authentication process, the frontend (i.e., user terminal 1002) may request the backend (i.e., system application 1004) to create a Case and to upload the Case's associated Files to the system application 1004. In some embodiments, files are not stored on the system application 1004. The cloud storage/file resources 1010 may be a service used to provide cloud-based storage. Permissions are granted to a file's resource based on a per-user basis, and access to resources are white-listed to each client's IP.

Services with which that the system application 1004 communicates include an index engine 122 (responsible for producing an index/summary) and PDF generator (responsible for generating PDFs). In some embodiments, the contents of files are not directly read by the system application 1004 as the system application 1004 is responsible for coordinating between the user terminal 1002 and underlying system machine-learning pipeline 1006 and document generating processes 1008.

As noted above, the BERT language model (https://arxiv.org/abs/1810.04805) may be used to obtain a vector representation of the candidate strings using a pre-trained language model. The vector representation of the string then passes through a fine-tuned multi-layer classifier a trained to detect titles, summaries, origins, dates, etc.

Figure 11:
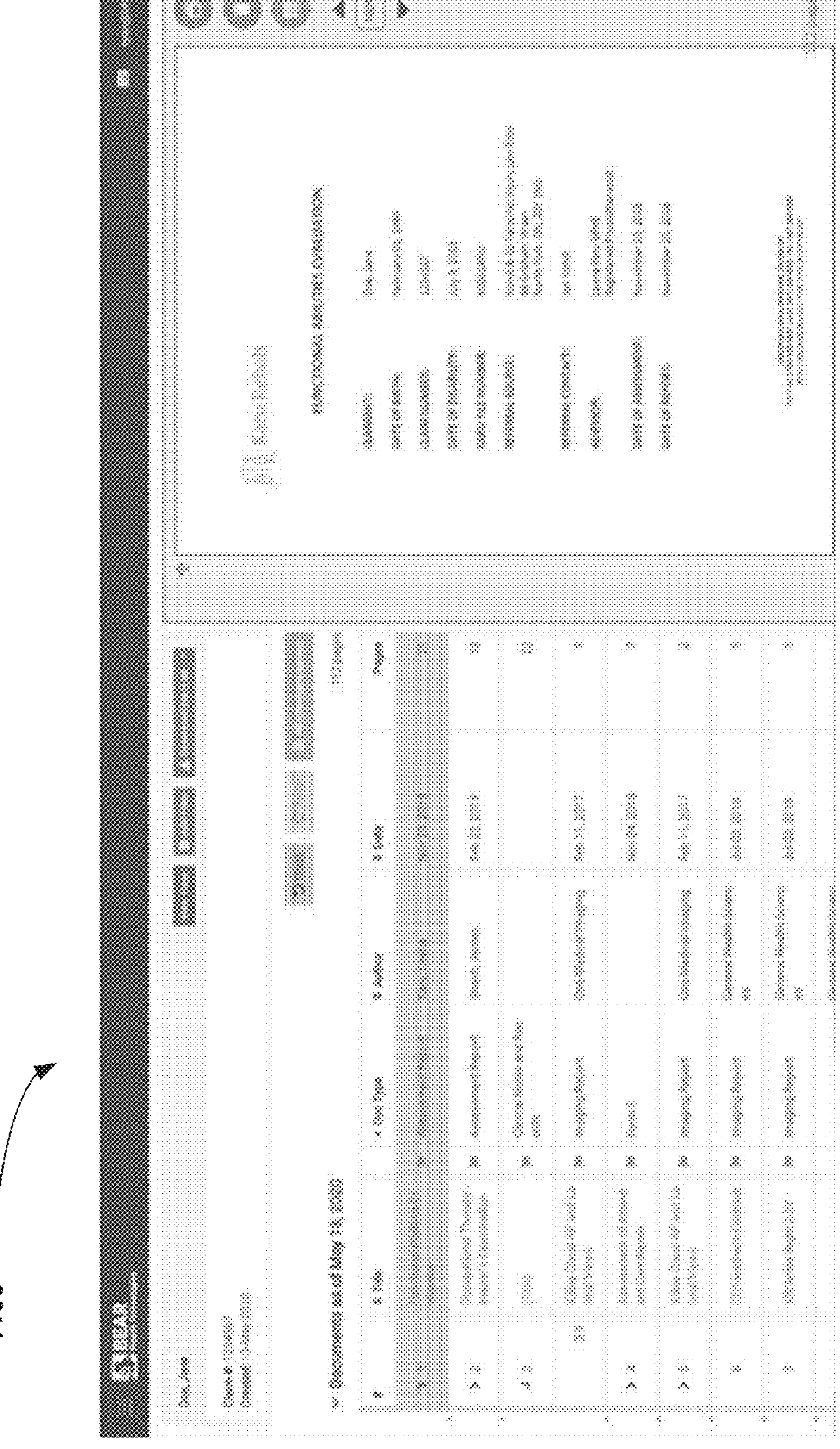
FIG. 11 illustrates, in a screen shot, an example of an index, in accordance with some embodiments.

In some embodiments, an index or document list (e.g., docList) may be generated. FIG. 11 illustrates, in a screen shot, an example of an index 1100, in accordance with some embodiments. FIG. 12 illustrates another example of an index 1200, in accordance with some embodiments. The index 1100, 1200 may include an automatically generated hyperlinked index with line items corresponding to documents/files uploaded to a case.

Figure 13:
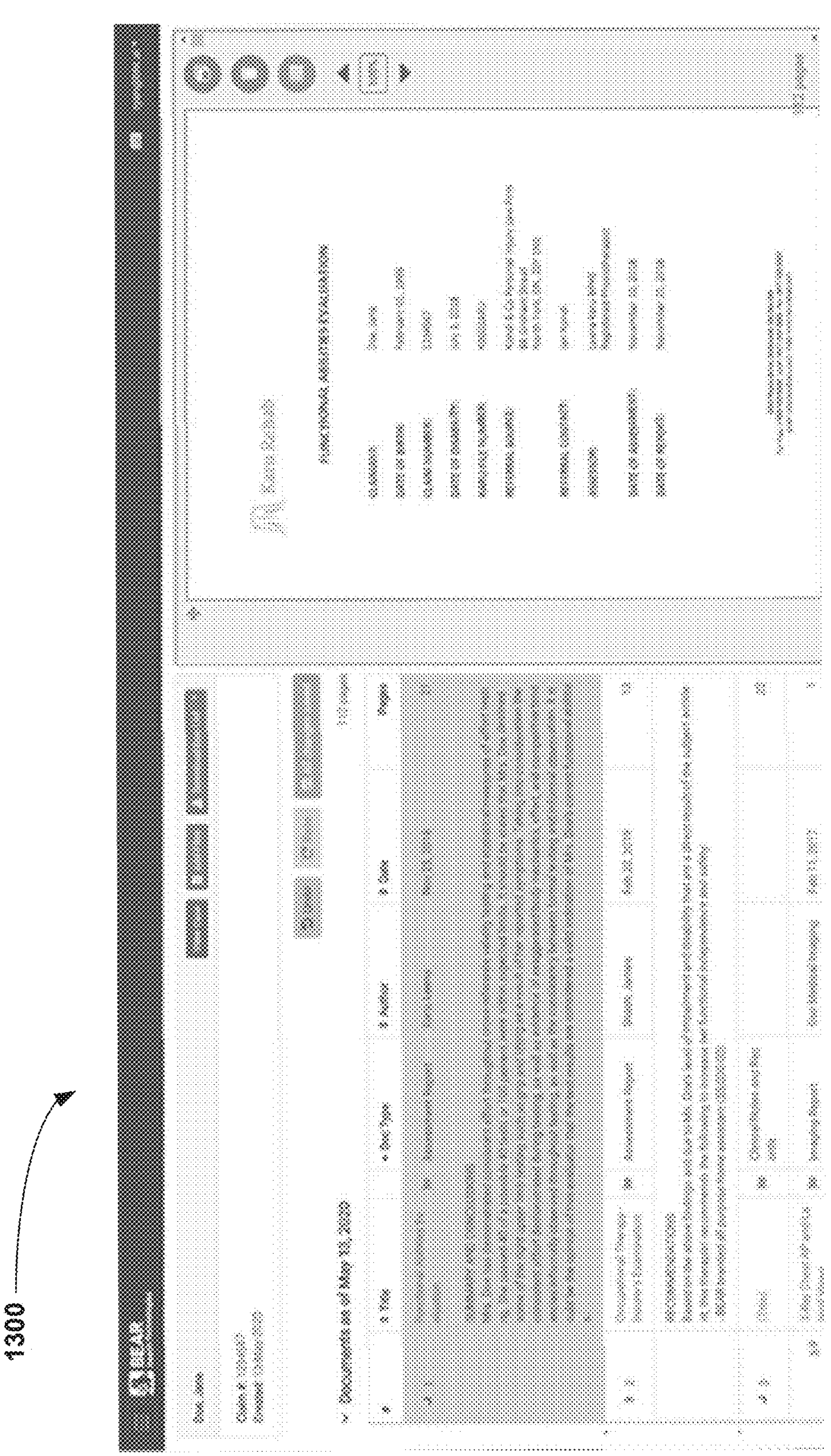
FIG. 13 illustrates, in a screen shot, an example of a document summary, in accordance with some embodiments.

In some embodiments, a summary or document review may be generated. FIG. 13 illustrates, in a screen shot, an example of a document summary 1300, in accordance with some embodiments. FIG. 14 illustrates another example of a document summary 1400, in accordance with some embodiments. Direct summaries may be extracted from documents/files (as described above) and attached to corresponding hyperlinked line items.

In some embodiments, a scoring system may help evaluate a machine learning (ML) model's performance. It is nontrivial to define a good evaluation approach, and even harder for a ML pipeline, where there are many ML models entangled together. An approach to evaluating a ML pipeline's performance will now be described. This approach is based on relational graph building and computation. For known document classification, the scoring system may address how the accuracy affects blocks of content associated with the known document. For document type classification, the scoring system may be associated with accuracy of the classification, and how an incorrect prediction and document separation between blocks of content may affect other indexes (such as, for example, how an incorrect prediction will affect the author, date, etc. for other indexes). Edit distance may be used to compute similarity.

Figure 15:
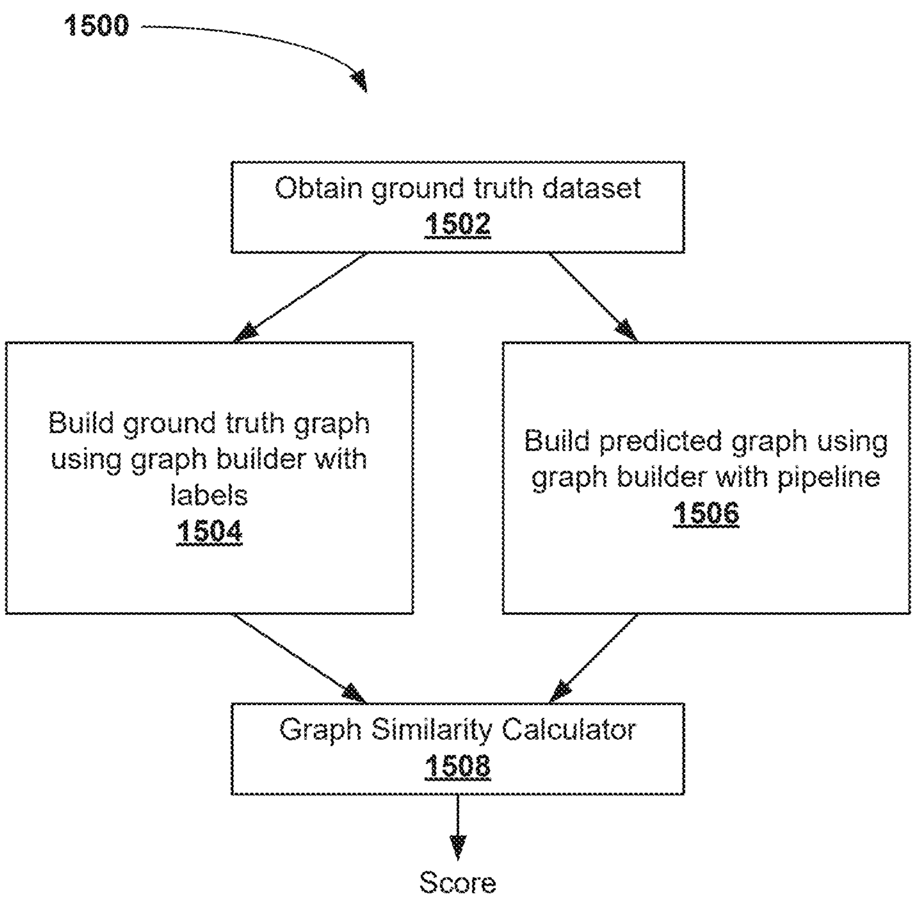
FIG. 15 illustrates, in a flowchart, a method of evaluating a ML pipeline performance, in accordance with some embodiments.

FIG. 15 illustrates, in a flowchart, a method of evaluating an ML pipeline performance 1500, in accordance with some embodiments. The method 1500 may be performed by the scoring engine 128. A ground truth data set is obtained 1500. A ground truth graph 1600 may be built 1504 using a graph builder with labels. A predicted graph 1700 may also be built 1506 using a graph builder with the methods described above. A graph similarity score between the ground truth graph 1600 and the predicted graph 1700 may be determined 1508. Other steps may be added to the method 1500.

Figure 16:
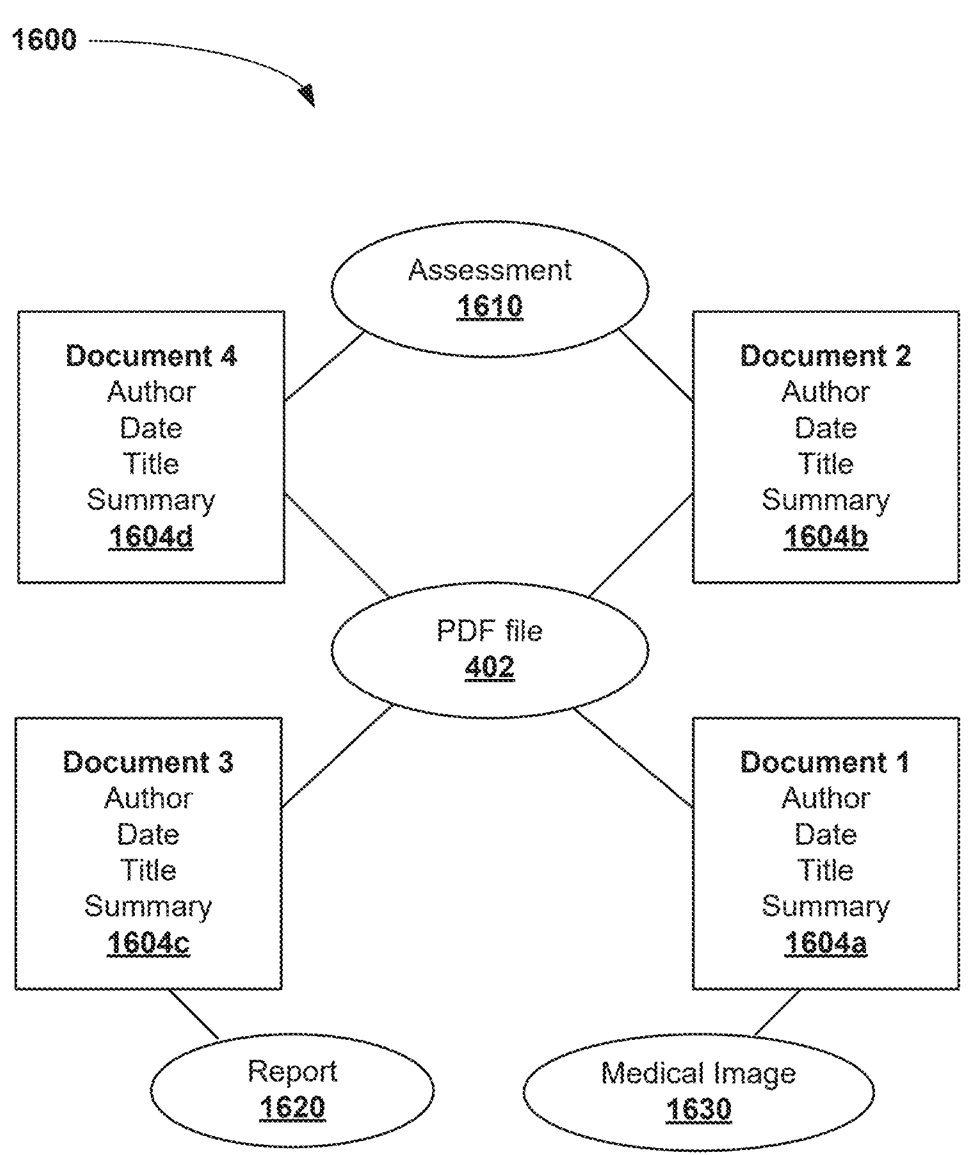
FIG. 16 illustrates, in a graph, an example of a ground truth graph, in accordance with some embodiments.

Given a ground truth dataset with manual labels 1502. For each PDF file 1602 and its labels in the dataset, a graph may be built 1504 with nodes as individual documents, types. FIG. 16 illustrates, in a graph, an example of a ground truth graph 1600, in accordance with some embodiments. The PDF file 1602 includes four documents 1604*a*, 1604*b*, 1604*c*, 1604*d*, with three different doc types (assessment 1610, report 1620 and medical image 1630), and each document has several attributes: author, date, title and summary. It should be noted that other examples of document types may be used.

Figure 17:
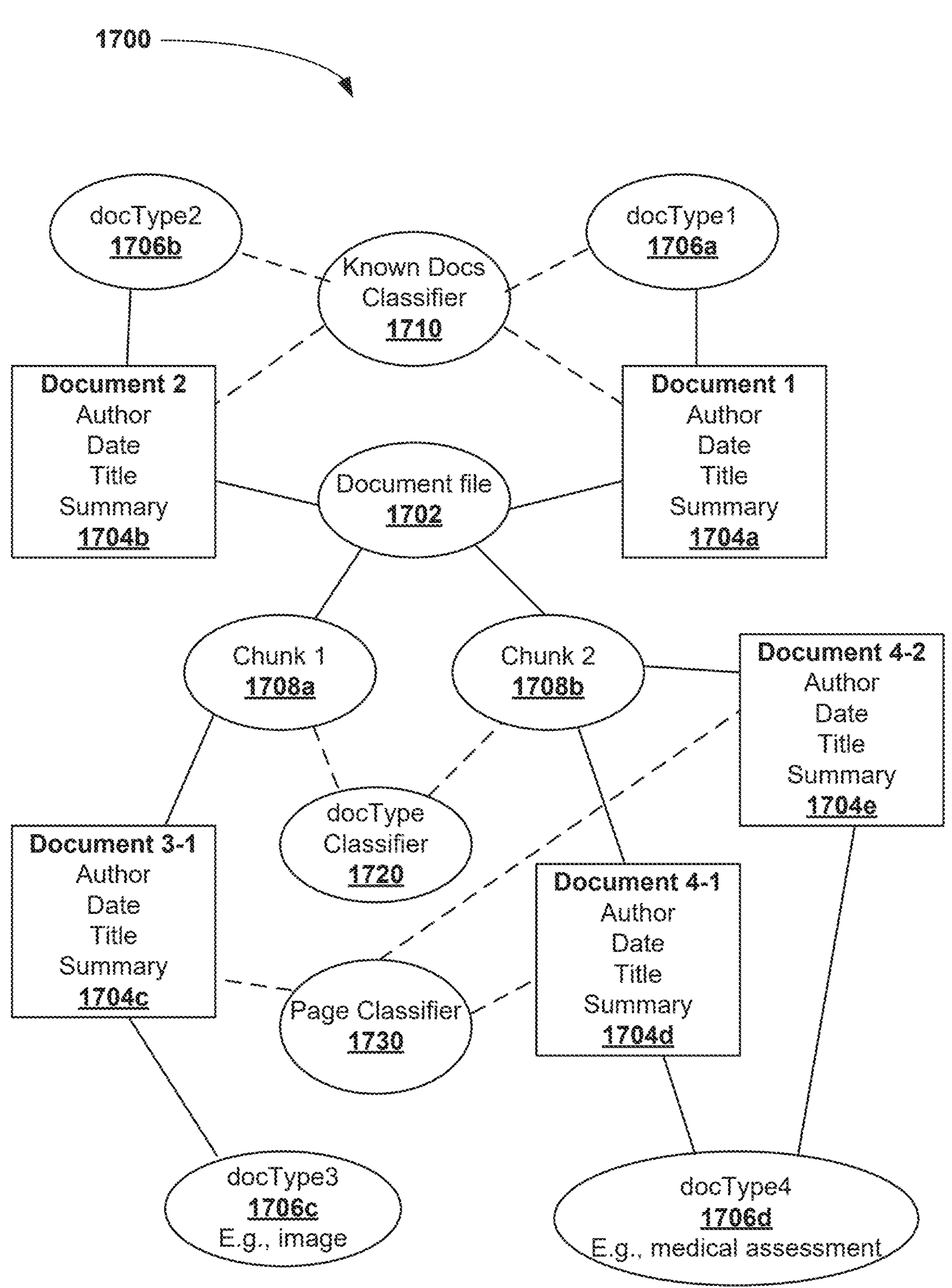
FIG. 17 illustrates, in a graph, an example of a predicted graph, in accordance with some embodiments.

For the same PDF file 1602 in the dataset, the methods described above may be applied on the file to predict the attributes. A predicted graph 1700 may then be built 1506. FIG. 17 illustrates in a graph, an example of a predicted graph 1700, in accordance with some embodiments. First, a known document classifier 1710 may extract 344 all known format files and their attributes. Then, a document type classifier 1720 may split (chunk 1 1708*a*, chunk 2 1708*b*) the unclassified pages into separate documents based on their docType 1706*a*, 1706*b*, 1706*c*, 1706*d*, and then feed these documents into a page classifier 1730 to obtain their predicted attributes.

A graph similarity calculator may be used to determine 1508 the distance or similarity between the ground truth graph 1600 and the predicted graph 1700. For example, a graph edit distance may be determined. In some embodiments, the similarity can be used as a metric to evaluate the machine learning pipeline's performance as compared with the ground truth. If the similarity score is higher than a predefined threshold, then there can be confidence to deploy the ML pipeline into production. Otherwise, the models 120 in the pipeline could be updated and fine-tuned with new dataset(s). Commonly seen unknown document types with low confidence can be hard coded into future version of the system.

Figure 18:
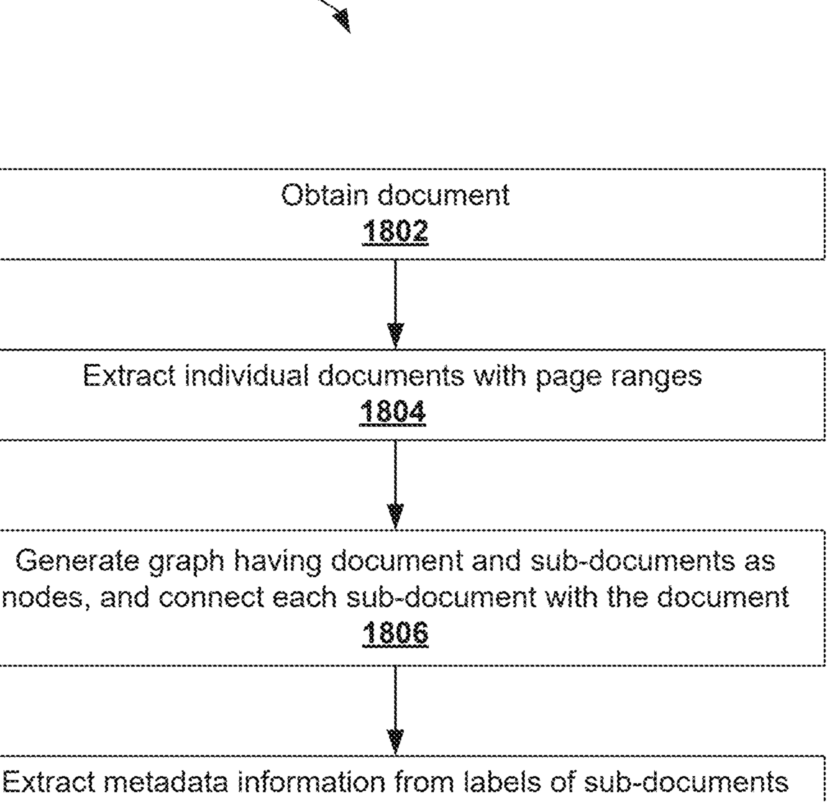
FIG. 18 illustrates, in a flowchart, a method of generating a graph, in accordance with some embodiments.

FIG. 18 illustrates, in a flowchart, a method of generating a graph 1800, in accordance with some embodiments. The method 1800 may be performed by the graph unit 127 and/or scoring engine 128. The method 1800 comprises obtaining a document file 1802 (such as, for example, receiving a PDF document 402 having manually inserted or machine-generated labels). Individual documents (i.e., sub-documents) may be extracted 1804 with page ranges. A graph may then be generated 1806 having the original document file and all sub-documents as nodes. Each sub-document may be connected with an edge to the original document file. Next, metadata information may be extracted 1808 from labels (e.g., docType, title, author/origin, date, summary, etc.) of the sub-documents. The graph may be extended 1810 with new nodes for docType and labels for each sub-document. Edges may be added connecting the sub-documents with their corresponding meta information (e.g., docType, title, author/origin, date, summary, etc.). If the obtained document file 1802 was a document having manually inserted labels, then a ground truth graph has been generated. If the obtained document file 1802 was a document having machine-generated labels, then a machine-generated graph has been generated. Other steps may be added to the method 1800.

Figure 19:
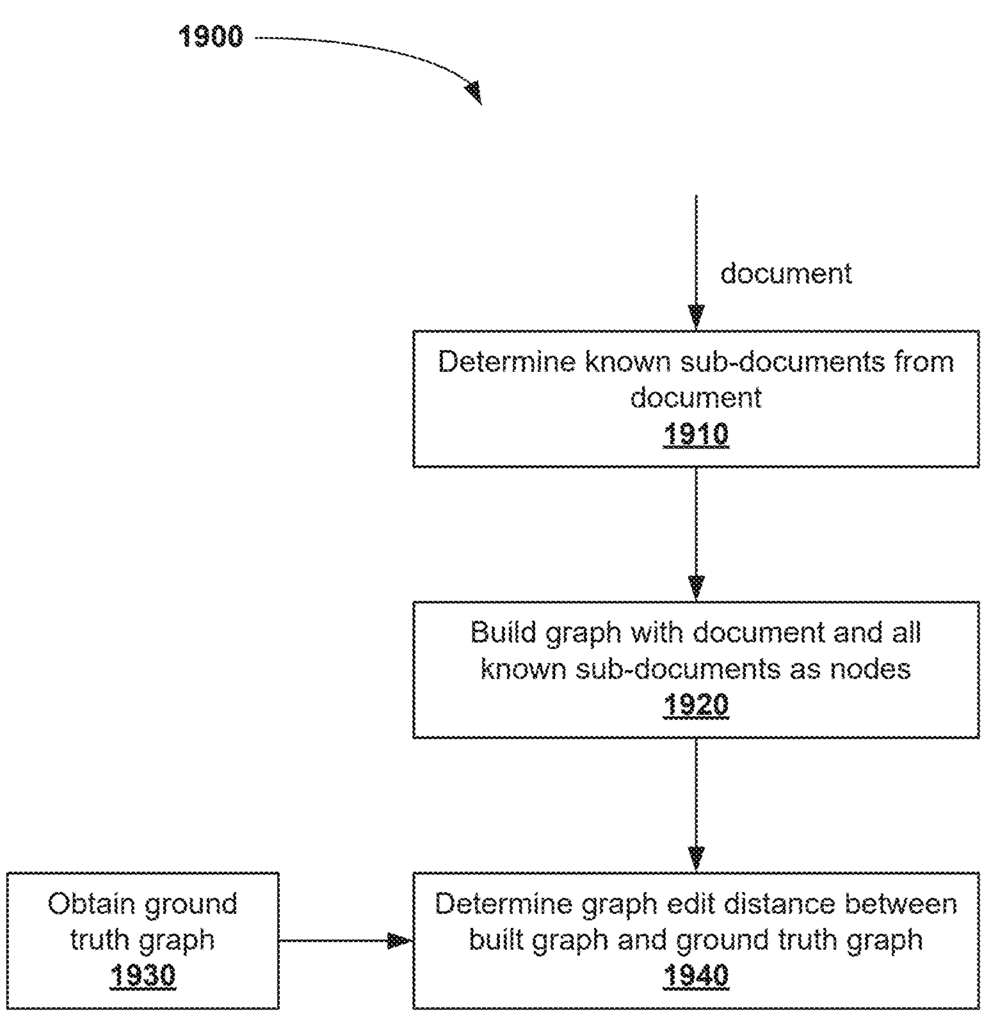
FIG. 19 illustrates, in a flowchart, another method of generating a graph, in accordance with some embodiments.

FIG. 19 illustrates, in a flowchart, another method of generating a graph 1900, in accordance with some embodiments. The method 1900 may be performed by the graph unit 127 and/or scoring engine 128. In some embodiments, the machine generated graph can be built on the fly. For example, after a known document classifier processes 1910 the document file 402, a graph can be generated 1806, 1920 that comprises the document file and all known sub-documents as nodes. At this point, the edit distance between this graph and an obtained 1930 ground truth graph (i.e., received, fetched or generated ground truth graph) can be determined 1940 using known techniques such as, for example, Levenshtein distance, Hamming distance, Jaro-Winkler distance, etc. This similarity/distance may be used to evaluate the known document classifier. Other steps may be added to the method 1900.

Figure 20:
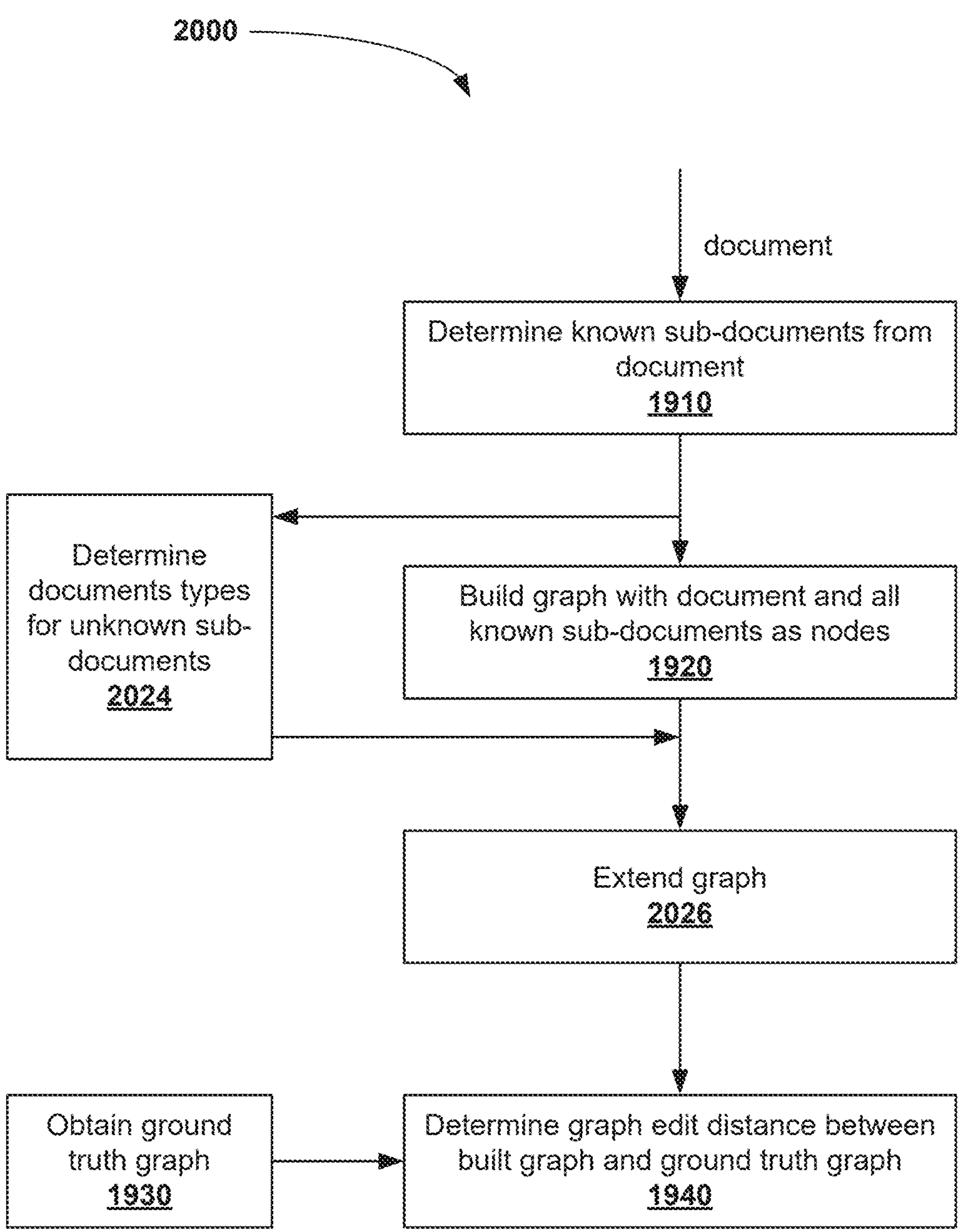
FIG. 20 illustrates, in a flowchart, another method of generating a graph, in accordance with some embodiments.

FIG. 20 illustrates, in a flowchart, another method of generating a graph 2000, in accordance with some embodiments. The method 2000 may be performed by the graph unit 127 and/or scoring engine 128. The method 2000 begins with determining the known sub-documents 1910, and generating a graph 1920 comprising the document file and all known sub-documents. After a docType classifier processes 2024 the pages in the document 402 having unknown document types, the graph may be extended 2026 with the additional docTypes and sub-documents determined by the docType classifier. The distance between this updated graph and the obtained 1930 ground truth graph may be determined 1940. This similarity/distance may be used to evaluate the combined performance of known document classifiers and document type classifiers. Once the similarity/distance scores reach a threshold value, then the system is ready to be deployed (i.e., the model 120 has been sufficiently trained). Other steps may be added to the method 2000.

Figure 21:
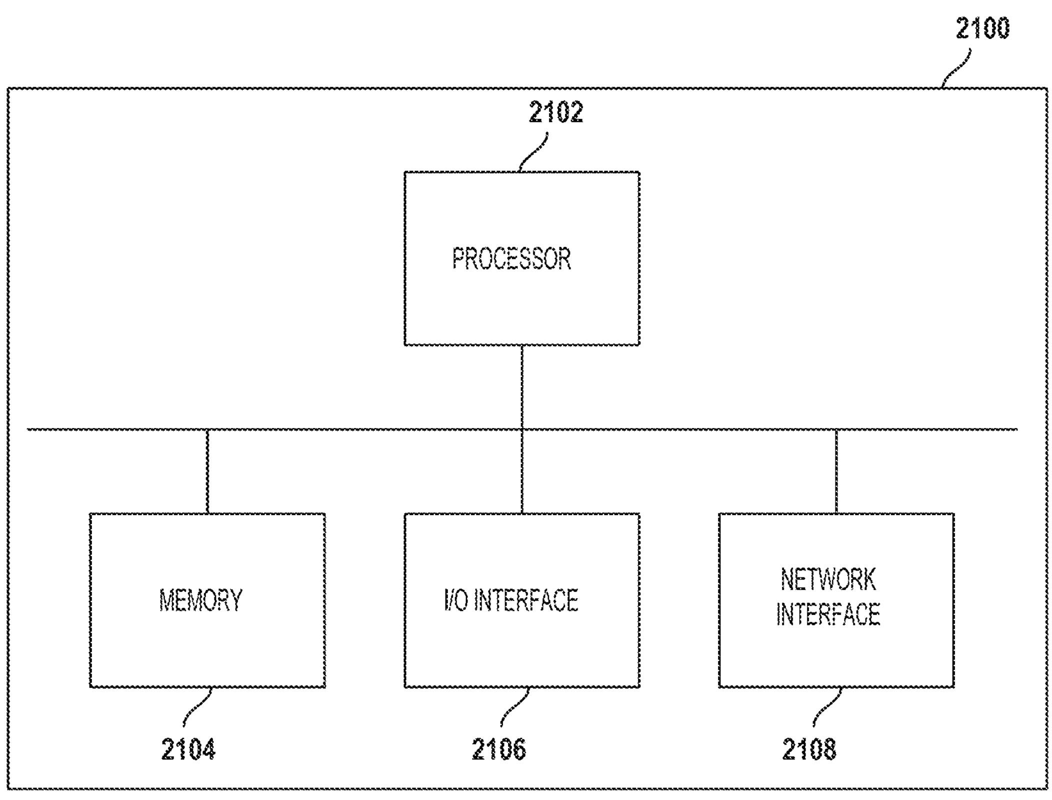
FIG. 21 is a schematic diagram of a computing device such as a server.

FIG. 21 is a schematic diagram of a computing device 2100 such as a server. As depicted, the computing device includes at least one processor 2102, memory 2104, at least one I/O interface 2106, and at least one network interface 2108.

Processor 2102 may be an Intel or AMD x86 or x64, PowerPC, ARM processor, or the like. Memory 2104 may include a suitable combination of computer memory that is located either internally or externally such as, for example, random-access memory (RAM), read-only memory (ROM), compact disc read-only memory (CDROM).

Each I/O interface 2106 enables computing device 2100 to interconnect with one or more input devices, such as a keyboard, mouse, camera, touch screen and a microphone, or with one or more output devices such as a display screen and a speaker.

Each network interface 2108 enables computing device 2100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g.

Wi-Fi, WiMAX), SS7 signaling network, fixed line, local area network, wide area network, and others.

The discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A document index generating system comprising:
at least one processor; and
a memory storing a sequence of instructions which when executed by the at least one processor configure the at least one processor to:
preprocess a plurality of pages into a collection of data structures, each data structure comprising a representation of data for a page of the plurality of pages, the representation comprising at least one region on the page;
classify each preprocessed page into at least one document type, including determining candidate document types for each page in the collection of data structures;
segment groups of classified pages into separate documents, said segmenting based on contiguous pages having at least one of:
similar document types;
similar titles; or
sequential page numbers located at a same region; and
generate a page and document index for the plurality of pages based on the classified pages and the documents;
obtain a document among the separate documents;
divide the document into chunks of content;
encode each chunk of content;
cluster each encoded chunk of content;
determine at least one central encoded chunk in each centroid of clustered encoded chunks; and
generate a summary for the document based on the at least one central encoded chunk for each of the clustered encoded chunks,
wherein to preprocess the plurality of pages into the collection of data structures, the at least one processor is configured to determine regions on that page based on the location of the region in relation to other regions on the page; and
wherein to determine candidate document types for the page, the at least one processor is configured to determine confidence score values for each candidate document type based on content in a summary block of the page.

2. The document index generating system as claimed in claim 1, wherein to preprocess the plurality of pages into a collection of data structures, the at least one processor is configured to:
for each page in the plurality of pages:
convert that page to a bit map file format;
determine regions on that page based on at least one of:
the location of a region on the page; or
the content in the region;
convert each region of that page into a machine-encoded content;
collect the regions and corresponding content for that page into a data structure for that page; and
merge the data structure for each page into the collection of data structures.

3. The document index generating system as claimed in claim 2, wherein to determine regions on that page, the at least one processor is configured to:
search sections of the page for text or other items, each section of the page comprising at least one of:
a top third of the page;
a middle third of the page;
a bottom third of the page;
a top quadrant of the page;

a bottom 15 percent of the page;
a bottom right corner of the page;
a top right corner of the page; or
the full page.

4. The document index generating system as claimed in claim 1, wherein to determine candidate document types for each page, the at least one processor is configured to:
determine confidence score values for each candidate document type based on at least one of:
a presence of a combination of regions on the page; or
content in at least one of:
a region category type for each region on the page;
a title of the page;
an origin of the page;
a date of the page; or
a page identifier.

5. The document index generating system as claimed in claim 1, wherein to segment groups of classified pages into documents, the at least one processor is configured to:
cluster contiguous pages based on at least one of:
similar document types;
similar document titles; or
sequential page numbers.

6. The document index generating system as claimed in claim 1, wherein the at least one processor is configured to:
analyze characteristics of the classified pages and the documents to update missing information in the page and document index.

7. The document index generating system as claimed in claim 1, wherein the at least one processor is further configured to:
determine a similarity score between a ground truth graph associated with the document and a predicted graph associated with the document, the at least one processor configured to:
obtain ground truth data with manually applied labels;
generate a graph for the ground truth data with manually applied labels;
generate a predicted graph using predicted attributes associated with the document, the at least one processor is configured to:
obtain classified pages and unclassified pages from the document using a known document classifier;
extract known attributes from the classified pages using a document type classifier; and
extract the predicted attributes from the unclassified pages using a page classifier; and
determine a graph edit distance between the generated graph for the ground truth data and the predicted graph.

8. The document index generating system as claimed in claim 7, wherein the at least one processor is configured to:
tokenize the document into sentences; and
group the sentences into the chunks of content.

9. The document index generating system as claimed in claim 7, wherein the at least one processor is configured to:
determine a corresponding vector for each chunk of content and determine a similarity score for all pairs of such vectors;
build a graph associated with the document, wherein nodes in the graph comprise the vectors and edges in the graph comprise connections between the vectors;
cluster the nodes in the graph into groupings;
determine at least one influential node in each grouping; and
generate the summary based on the at least one influential node in each grouping.

10. The document index generating system as claimed in claim 7, wherein the at least one processor is configured to:
determine a corresponding vector for each chunk of the chunks of content and determine a similarity score for all pairs of such vectors;
build a graph associated with the document, wherein nodes in the graph comprise the vectors and edges in the graph comprise connections between the vectors;
cluster the nodes in the graph into groupings;
determine at least one influential node in each grouping; and
generate the summary based on the at least one influential node in each grouping.

11. A computer-implemented method of generating an index of a document, the method comprising:
preprocessing a plurality of pages into a collection of data structures, each data structure comprising a representation of data for a page of the plurality of pages, the representation comprising at least one region on the page;
classifying each preprocessed page into at least one document type, including determining candidate document types for each page in the collection of data structures;
segmenting groups of classified pages into separate documents, said segmenting based on contiguous pages having at least one of:
similar document types;
similar titles; or
sequential page numbers located at a same region; and
generating a page and document index for the plurality of pages based on the classified pages and the documents;
obtaining a document among the separate documents;
dividing the document into chunks of content;
encoding each chunk of content;
clustering each encoded chunk of content;
determining at least one central encoded chunk in each centroid of clustered encoded chunks;
generating a summary for the document based on the at least one central encoded chunk for each of the clustered encoded chunks,
wherein preprocessing the plurality of pages into the collection of data structures comprises determining regions on that page based on the location of the region in relation to other regions on the page; and
wherein determining candidate document types for the page comprises determining confidence score values for each candidate document type based on content in a summary block of the page.

12. The computer-implemented method as claimed in claim 11, wherein preprocessing the plurality of pages into a collection of data structures comprises:
for each page in the plurality of pages:
converting that page to a bit map file format;
determining regions on that page based on at least one of:
the location of a region on the page;
the content in the region; or
the location of the region in relation to other regions on the page;
converting each region of that page into a machine-encoded content;
collecting the regions and corresponding content for that page into a data structure for that page; and
merging the data structure for each page into the collection of data structures.

13. The computer-implemented method as claimed in claim 12, wherein determining regions on that page comprises:

searching sections of the page for text or other items, each section of the page comprising at least one of:

a top third of the page;

a middle third of the page;

a bottom third of the page;

a top quadrant of the page;

a bottom 15 percent of the page;

a bottom right corner of the page;

a top right corner of the page; or the full page.

14. The computer-implemented method as claimed in claim 11, wherein determining candidate document types for each page comprises:

determining confidence score values for each candidate document type based on at least one of:

a presence of a combination of regions on the page; or content in at least one of:

a region category type for each region on the page;

a title of the page;

an origin of the page;

a date of the page; or a page identifier.

15. The computer-implemented method as claimed in claim 11, wherein segmenting groups of classified pages into documents comprises:

clustering contiguous pages based on at least one of:

similar document types;

similar document titles; or sequential page numbers.

16. The computer-implemented method as claimed in claim 11, comprising:

analyzing characteristics of the classified pages and the documents to update missing information in the page and document index.

17. The computer-implemented method as claimed in claim 11, further comprising:

determining a similarity score between a ground truth graph associated with the document and a predicted graph associated with the document by:

obtaining ground truth data with manually applied labels;

generating a graph for the ground truth data with manually applied labels;

generating a predicted graph using predicted attributes associated with the document, said predicted attributes obtained by:

obtaining classified pages and unclassified pages from the document using a known document classifier;

extracting known attributes from the classified pages using a document type classifier; and extracting the predicted attributes from the unclassified pages using a page classifier; and determining a graph edit distance between the generated graph for the ground truth data and the predicted graph.

18. The computer-implemented method as claimed in claim 17, comprising:

tokenizing the document into sentences; and grouping the sentences into the chunks of content.

19. The computer-implemented method as claimed in claim 17, comprising:

determining a corresponding vector for each chunk of content and determining a similarity score for all pairs of such vectors;

building a graph associated with the document, wherein nodes in the graph comprise the vectors and edges in the graph comprise connections between the vectors;

clustering the nodes in the graph into groupings;

determining at least one influential node in each grouping; and generating the summary based on the at least one influential node in each grouping.

* * * * *